INVENTOR.
JOHN M. RIDD
BY *[signature]*
ATTY.

Nov. 2, 1954 J. M. RIDD 2,693,507

AUTOMATIC TELEPHONE SYSTEM

Filed May 15, 1952 8 Sheets-Sheet 2

CORD CIRCUIT 200 FIG. 2

*INVENTOR.*
JOHN M. RIDD

*BY* Mc Walter Owen.

ATTY.

Nov. 2, 1954 J. M. RIDD 2,693,507

AUTOMATIC TELEPHONE SYSTEM

Filed May 15, 1952 8 Sheets-Sheet 3

INVENTOR.
JOHN M. RIDD

BY McWatters Owen

ATTY.

INVENTOR.
JOHN M. RIDD
BY Wm. Walter Owen.
ATTY.

AUTOMATIC TELEPHONE SYSTEM

Filed May 15, 1952 8 Sheets-Sheet 5

CONNECTOR CKT. 500

INVENTOR.
JOHN M. RIDD
BY Wm. Walter Owen
ATTY.

INVENTOR.
JOHN M. RIDD
BY [signature]
ATTY

Nov. 2, 1954 J. M. RIDD 2,693,507

AUTOMATIC TELEPHONE SYSTEM

Filed May 15, 1952 8 Sheets-Sheet 7

INVENTOR.
JOHN M. RIDD
BY [signature]
ATTY.

INVENTOR.
JOHN M. RIDD
BY Wm. Walter Owen
ATTY.

United States Patent Office 2,693,507

Patented Nov. 2, 1954

2,693,507

AUTOMATIC TELEPHONE SYSTEM

John M. Ridd, Los Angeles, Calif., assignor to Automatic Electric Laboratories, Inc., Chicago, Ill., a corporation of Delaware Application May 15, 1952, Serial No. 287,840

21 Claims. (Cl. 179—27)

The present invention relates in general to automatic telephone systems and more particularly to supervisory arrangements in such systems.

In systems of this type in which some or all of the calls are handled with the assistance of an operator it has been found advantageous to provide the operator with a visual busy indication, generally consisting in the flashing of the supervisory lamp at the operator's switchboard, when a busy condition is encountered by the switching equipment. An audible busy indication in the form of a busy tone is usually returned in addition to the flashing signal. This audible signal supplements the visual signal when the operator is listening in, and it also serves as a busy signal for the calling subscriber if the connection to this subscriber is switched through at the switchboard.

In automatic telephone systems of the loop signaling type it is convenient to return the busy flash signal from the automatic switching equipment by periodically switching the normally ground connected side of the calling bridge in this equipment to battery. A supervisory relay inserted in the calling end of the loop circuit is thus periodically short-circuited and therefore, released to cause the lamp at the operator's switchboard to flush. During the intervals between these short-circuits busy tone is transmitted by means of a tone source interposed in the afore-mentioned ground connection.

In order that a distinct flashing signal be obtained the periodicity of this switching action should be low, say of the order of 40 I. P. M. At such a rate of switching however, the calling bridge relay which is normally operated in the afore-mentioned loop circuit is de-energized by each of these periodic short-circuits long enough to permit the release delay relay of the switching equipment in question to restore and thereby cause this equipment to release. To avoid this, means must be provided for locally holding the switching equipment during each interval, hereafter referred to as the flash interval, in which the normally ground connected side of the calling bridge is connected to battery. These requirements can be met for instance, by the provision of an interrupter having two sets of springs synchronously actuated at the afore-mentioned rate, one of these sets periodically switching one side of the calling bridge from a grounded busy tone source to battery while the other simultaneously therewith connects a ground connected holding winding, for example, a second winding on the above mentioned release delay relay, to battery. In this manner a busy flash signal may be returned from a connector if the called line has been found busy, or from a selector or other trunk hunting switch if an all trunks busy or overflow condition is encountered in a given trunk group.

While arrangements of this kind have distinct advantages, difficulties are encountered where one or more repeaters are included in the connection. This is because release of a repeater by the calling party under a flash busy condition at a time when the automatic switching equipment at the distant end is artificially held by the above mentioned local holding means, that is during a flash interval, might easily lead to a faulty operation, namely if the repeater is seized by a new call before the equipment at the far end has had a chance to restore.

It is the principal object of the present invention to provide means whereby the afore-mentioned difficulties may be overcome in a simple manner.

One feature of the invention accordingly resides in the provision of means in the repeater which are triggered by a flashing signal returned by the distant switching equipment and which act to release the switching equipment without waiting for a disconnect signal from the calling side of the connection and return a flashing signal to that side from a local source.

According to another feature of the invention the supervisory relay in the repeater which is operated over the loop circuit upon seizure releases in response to the first short-circuiting of the loop at the far end to cause the loop circuit between the repeater and the automatic equipment to be permanently opened and a flashing signal to be returned from the last-mentioned local source. Preferably the arrangement is such that should the supervisory relay fail to operate initially due to an unstandard condition, for instance, because there is a disconnection in the trunk circuit interconnecting the repeater with the automatic equipment or because the switch at the far end of the trunk is removed, the results will be the same, that is in both cases a busy signal is returned to the calling party.

According to another feature of the invention, a "busy-back" relay in the repeater which operates to guard the repeater against seizure if for example, a busy key is thrown in the distant automatic equipment, is used as the local holding means to prevent the release of the repeater during the flash interval while flash busy is returned from the repeater.

In addition to the above mentioned supervisory relay the supervisory loop circuit may also include a polarized relay which is normally unoperated but operates responsive to a reversal of the polarity of the loop circuit by the distant equipment to return an answering supervisory signal or signals including, if required, a metering signal to the calling side.

In this connection another feature of the invention which is alternative to the switch release feature mentioned above, resides in the provision of means in the repeater for keeping the repeater guarded during each time interval in which the switching equipment returning the flashing signal is artificially held by local means. This feature is of particular significance in connection with an interoffice link, having a supervisory circuit of the type over which supervisory signals are returned by changing the condition of that circuit from one to the other of only two possible conditions. As in a supervisory arrangement of this kind, separate electrical criteria for the return of a busy flash signal and an answering signal are not available, the release of the link upon the first change of condition of the supervisory circuit is not a feasible solution of the above mentioned difficulty.

Reverting to the metering signal referred to above, another feature of the invention resides in the provision of simple and reliable means whereby for metering purposes booster battery may be momentarily connected to the back control conductor of a repeater or switch in two current steps to prevent damage to the switching contacts involved.

It was mentioned above that the busy signal may originate in a trunk hunting switch such as a selector if an all trunks busy or overflow condition is encountered by that switch. In this connection a further feature of the invention consists in the provision of simple and efficient means for the connection of a flashing source in this switch under the afore-mentioned condition.

The invention, both as to its organization and method of operation together with other objects and features thereof, will best be understood by reference to the following specification taken in connection with the accompanying drawing. In these drawings, Fig. 1 is a schematic trunking diagram of a telephone system embodying the invention.

Fig. 2 is a detailed circuit diagram of a cord circuit 200 and operator's circuit 28 associated with a switchboard 10, all as shown in Fig. 1.

Figure 1:
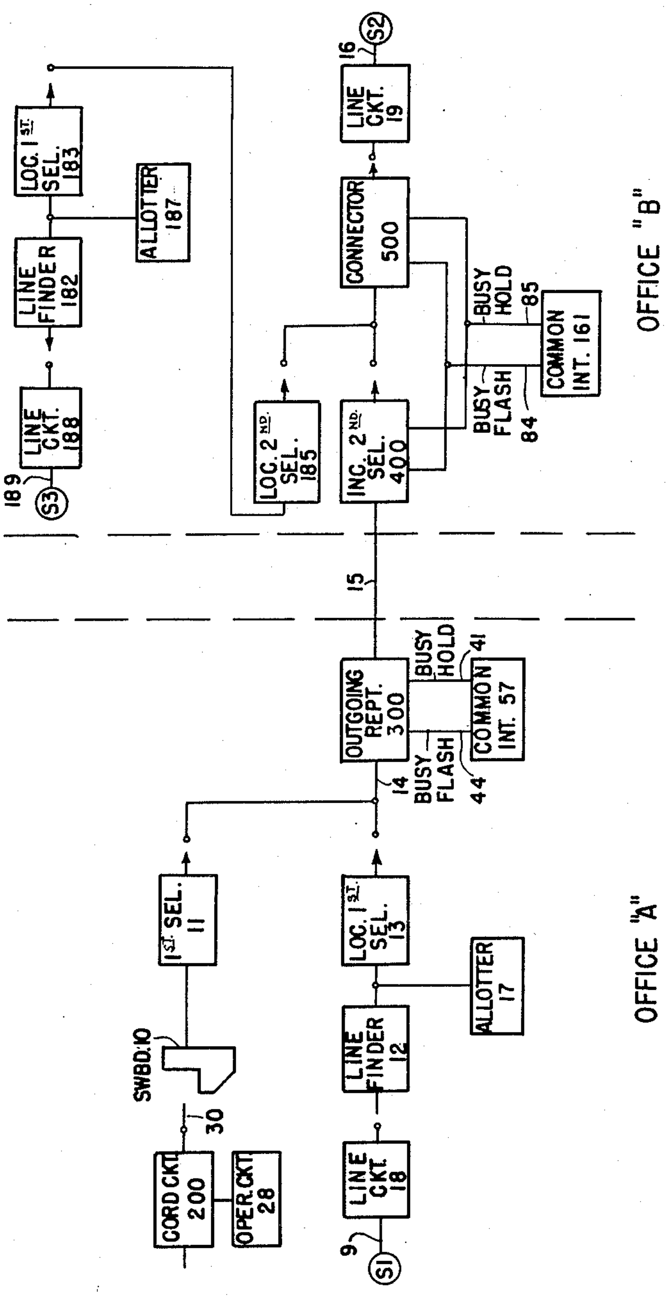
Figure 3:
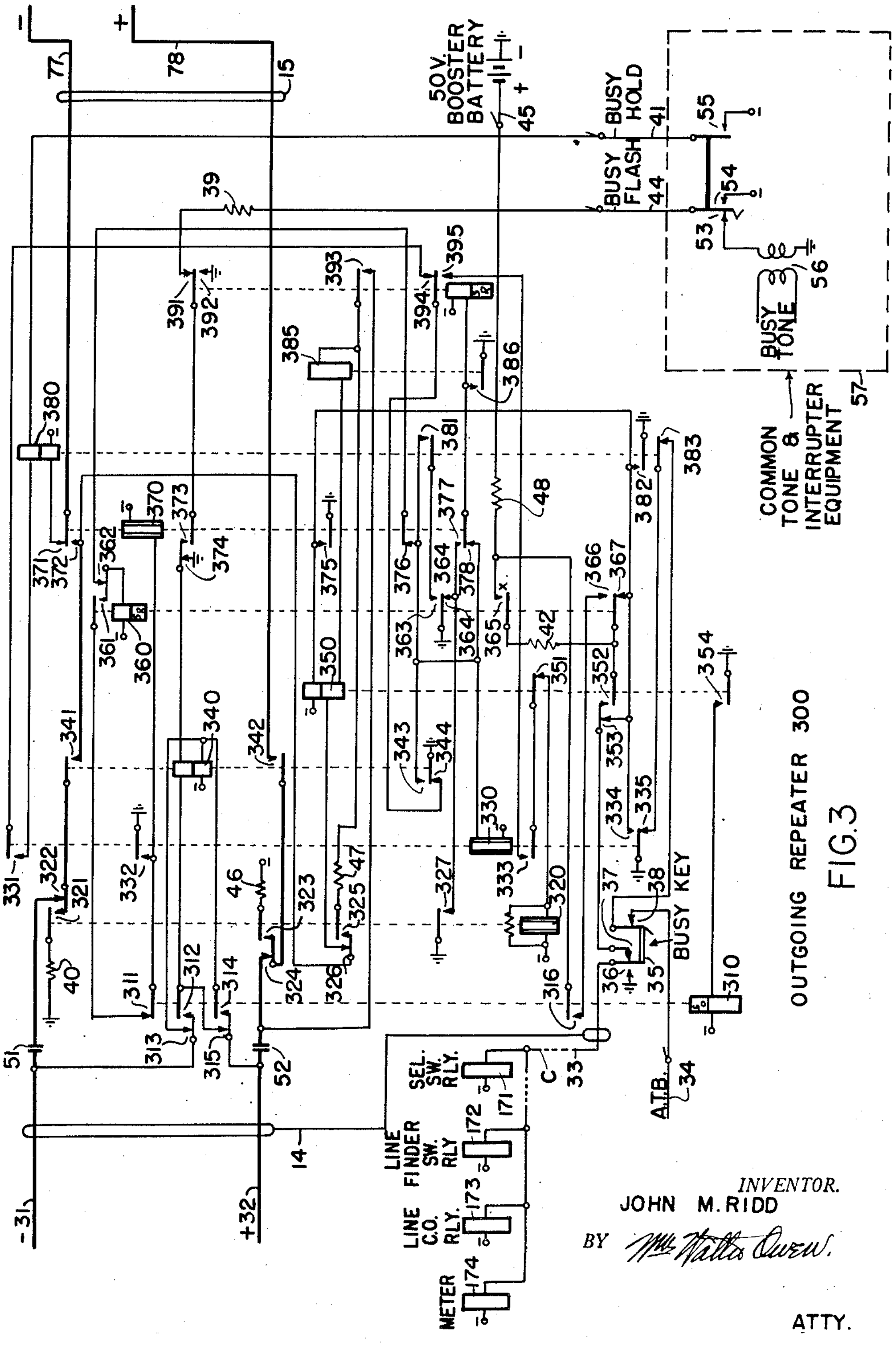
Fig. 3 is a detailed circuit diagram of an outgoing repeater 300 provided at one end of a loop trunk 15, both as shown in Fig. 1.
Figure 4:
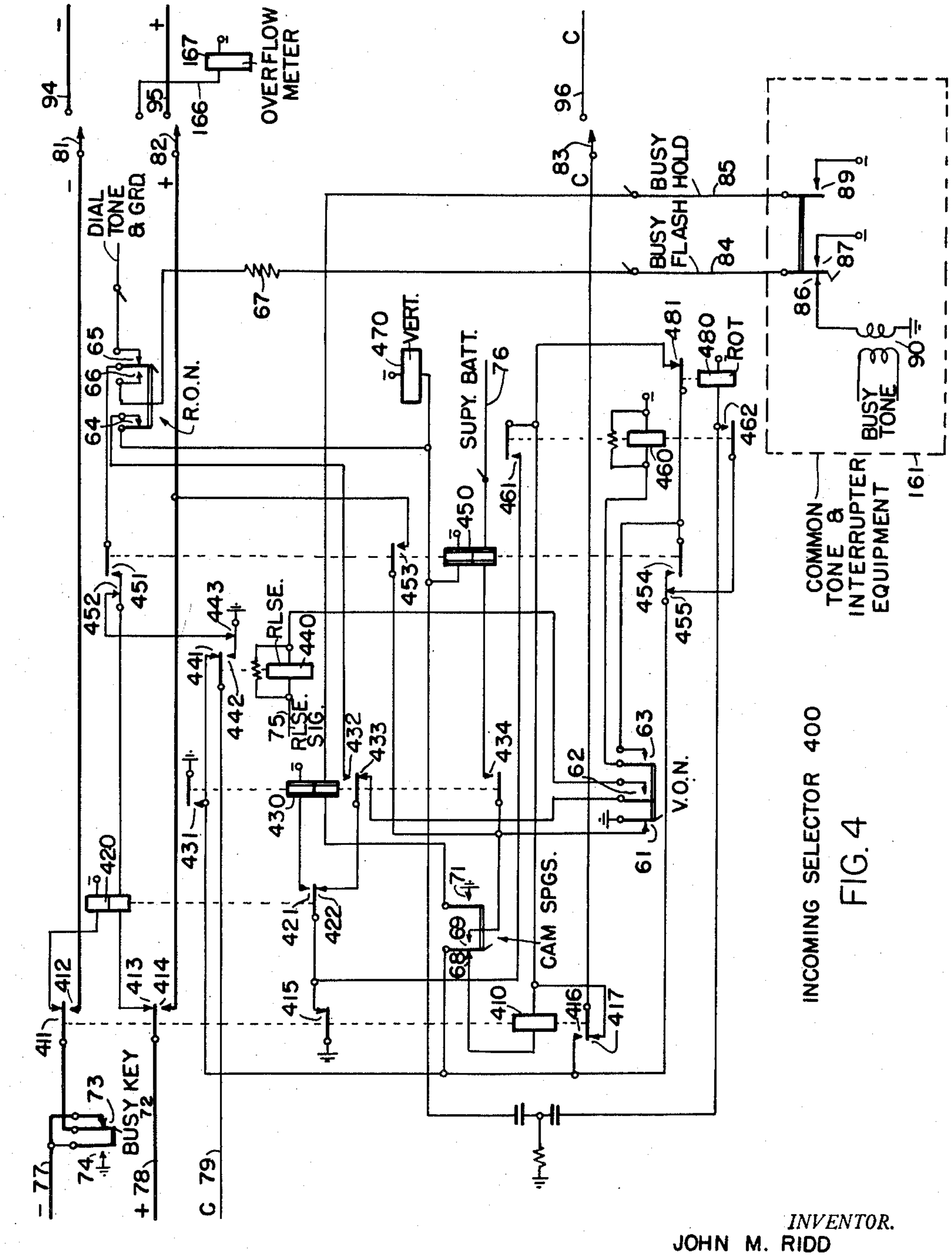
Fig. 4 is a detailed circuit diagram of a selector 400 associated with the other end of trunk 15, as shown in Fig. 1.
Figure 5:
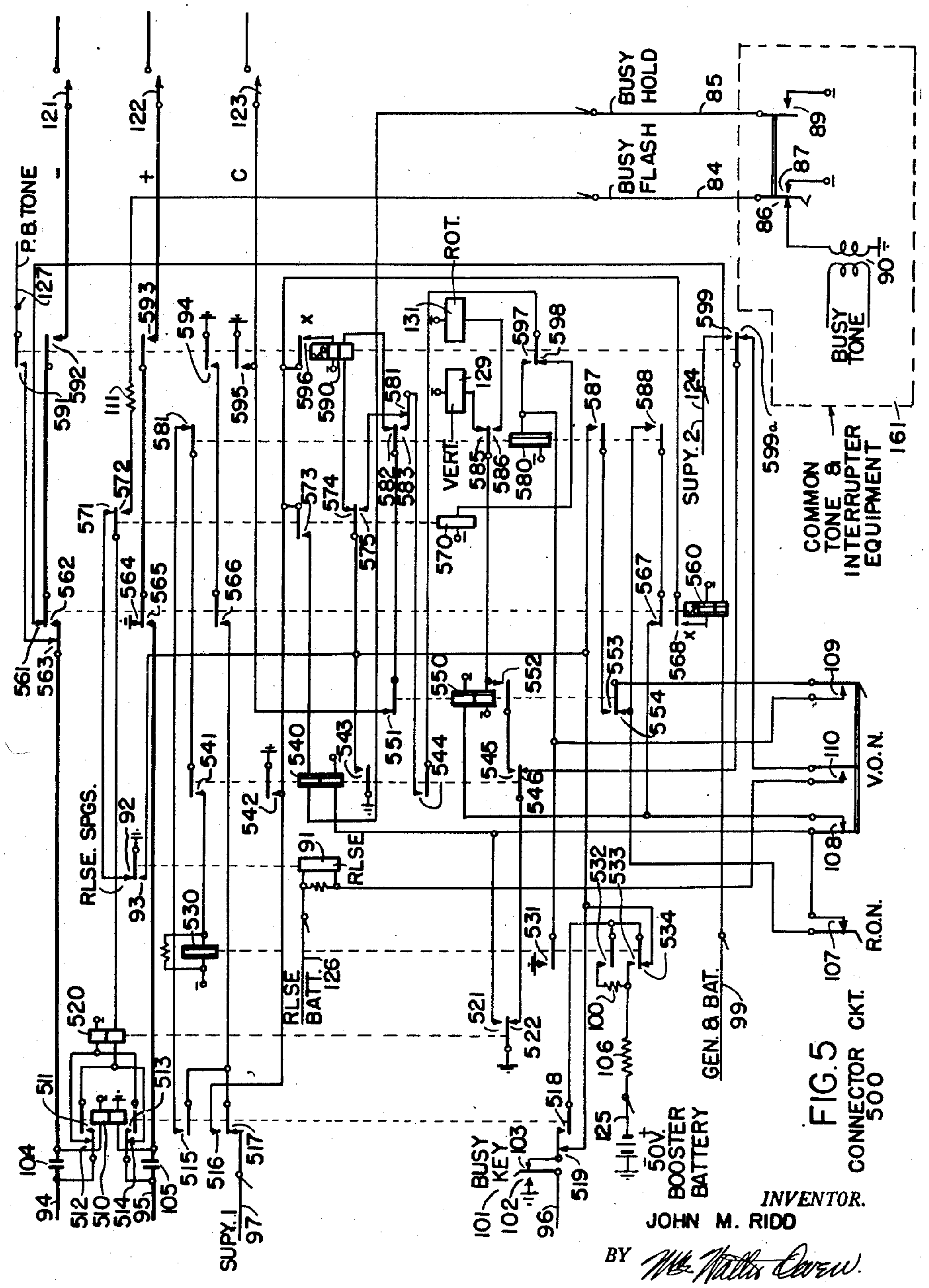
Fig. 5 is a detailed circuit diagram of a connector 500, as likewise shown in Fig. 1.

As will be evident from Fig. 1, Fig. 4 should be placed to the right of Fig. 3 and Fig. 5 to the right of Fig. 4.

Figure 6:
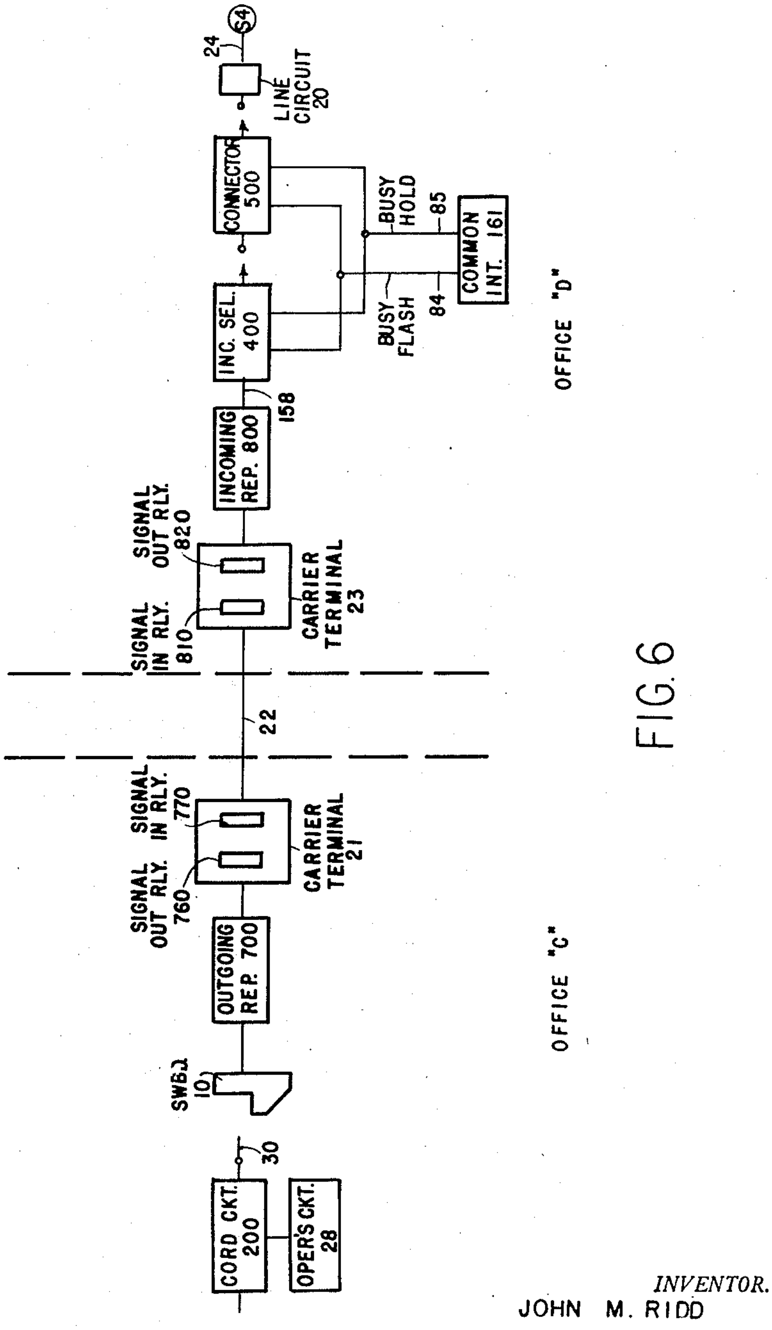

Fig. 6 is a schematic trunking diagram of another telephone system embodying the invention.

Figure 7:
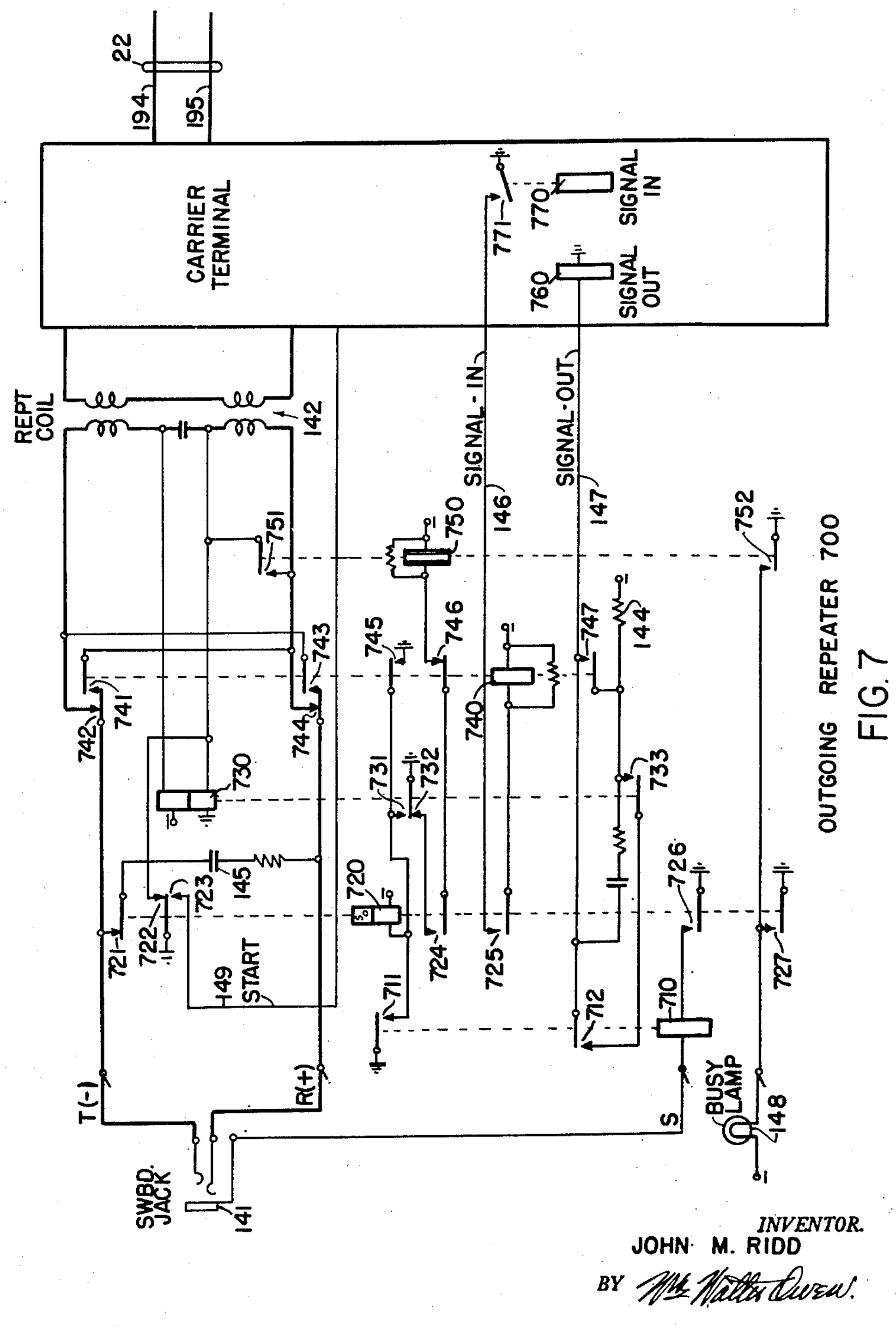

Fig. 7 is a detailed circuit diagram of an outgoing repeater 700 which is associated with a carrier terminal 21 at the outgoing end of a carrier link 22, all as shown in Fig. 6.

Figure 8:
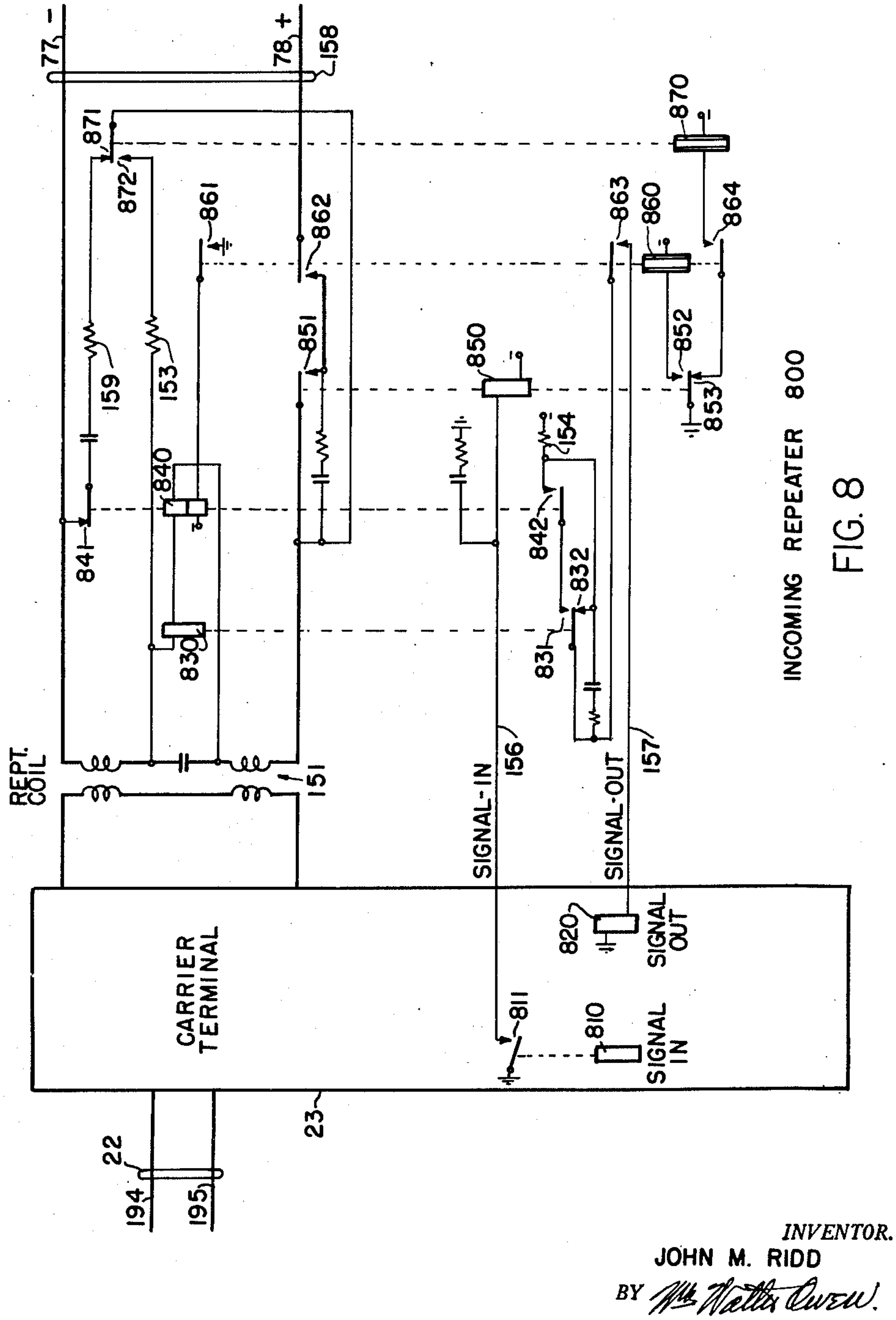

Fig. 8 is a detailed circuit diagram of an incoming repeater 800 which is associated with a carrier terminal 23 at the incoming end of link 22, all as shown in Fig. 6.

As will be evident from Fig. 6, the drawings involved in the embodiment according to this Fig. 6 form a unified system if Figs. 2, 7, 8, 4 and 5 are placed, side by side, from left to right in this order.

Referring now more particularly to Fig. 1 of the drawings there is illustrated in schematic form an automatic telephone system comprising offices A and B. These offices are interconnected by a number of interoffice trunks such as trunk 15, which in the embodiment described hereinafter is assumed to be of the one way type, being terminated in office A by an outgoing repeater 300 and in office B by an incoming selector 400. This selector has access through connector 500 to line circuits such as line circuit 19 associated with line 16 of substation S2. Another group of trunks similar to trunk 15 may be provided to handle the telephone traffic between the two offices in the opposite direction, these other trunks not being shown in Fig. 1.

Outgoing repeater 300 in office A is associated with a local trunk 14 which is accessible over the banks of local first selectors 13. These selectors together with line finders 12 form local links in office A which are served by allotters such as allotter 17. Line circuits 18, each associated with a subscriber's line such as line 9 of substation S1 are connected to the banks of line finders 12 and also to the banks of the connectors in office A, these connectors not being shown in Fig. 1. The local trunks 14 associated with outgoing repeaters 300 have a multiple appearance in the banks of first selectors 11 each of which is accessible through an associated jack in the multiple of a switchboard 10. Office A has a common interrupter 57 which serves, in particular, outgoing repeaters 300 and is connected with these repeaters over a busy flash conductor 44 and a busy hold conductor 41.

Office B also is provided with local links, these links comprising line finders 182 and local first selectors 183 and being served by allotter 187. Connected to the bank multiple of line finders 182 are line circuits, for example, line circuit 188 which terminates subscribers line 189 of substation S3. The banks of line finders 182 are multipled to the banks of connectors 500 in the usual manner; this multiple connection has not been shown in Fig. 1. The local first selectors 183 in office B have access to connectors 500 through local second selectors 185, the banks of these local and incoming second selectors being multipled with each other as shown. Office B has a common interrupter 161 which is connected with second selectors 400 and connectors 500 through a busy flash conductor 84 and a busy hold conductor 85.

Line finders 12 and 182, selectors 11, 13, 183, 185 and 400 and connectors 500 may be of any suitable construction but for the purposes of the present description have been assumed to be of the Strowger two-motion type.

For purposes of illustration it is assumed that the primary function of switchboard 10 in office A is the handling of calls originating in other offices not shown, and passing through office A as the tandem office to a distant office such as B. Such tandem calls are set up by the operator at switchboard 10 with the aid of cord circuit 200 and common operator's circuit 28. Assuming for example, that the operator wishes to set up a call to subscriber S2 in office B the operator upon ascertaining this called party's number from the calling subscriber inserts calling plug 30 of cord circuit 200 into the switchboard jack connected with an idle one of first selectors 11. The operator then actuates a calling device associated with operator's circuit 28 in accordance with the first digit of the called subscriber's number to raise the wipers of this selector to a level giving access to a group of local trunks including trunk 14. Upon seizure of outgoing repeater 300 over this local trunk a loop is closed in this repeater over interoffice trunk 15 and incoming selector 400 in office B is seized over this loop in a well known manner. Responsive to the second digit of the called subscriber's number the wipers of this second selector are then raised to the level over which the group of connectors including connector 500 shown in Fig. 1 are accessible, and the selector then seizes and switches through to an idle one of these connectors. In response to the last two digits the wipers of this connector are finally brought into engagement with the set of contacts in the connector bank to which line circuit 19 of called subscriber S2 is connected.

If line 16 of this subscriber is idle, connector 500 switches through and the bell at station S2 is rung in the usual manner. When subscriber S2 answers the call by lifting his receiver the ringing is automatically stopped and the answering bridge relay in connector 500 operates to reverse the direction of current flow over loop trunk 15. A polarized relay included in this loop in outgoing repeater 300 operates in response to this current reversal to actuate a reversal relay which in turn reverses the polarity of the calling loop extending back over local trunk 14; and another polarized relay in operator's cord circuit 200 upon operating in response to this reversal of polarity extinguishes the supervisory lamp associated with this cord circuit, this lamp having originally been lit by the operation of a supervisory relay, also included in the calling loop, when the operator first inserted plug 30 into the switchboard jack. The aforementioned darkening of the supervisory lamp serves as an indication to the operator that the call has been answered.

Assuming now that the called subscriber's line 16 is busy, a visual as well as an audible busy signal is returned to the calling side by connector 500. More particularly, upon operation and locking of the busy relay in connector 500 one winding of the calling bridge relay of this connector is switched from direct ground to the busy flash conductor 84, the other end of which is connected to common interrupter 161. This interrupter alternately connects battery and busy-tone-superimposed ground to the aforementioned conductor at a rate of approximately 40 I. P. M., that is 40 switching operations per minute. In this manner both legs of the supervisory loop extending over trunk 15 are periodically connected to the same potential, namely battery, and hence both the calling bridge relay in connector 500 and a supervisory relay included in the loop circuit in outgoing repeater 300 are periodically de-energized. In order to keep the release delay relay of connector 500 from restoring during the flash intervals in which the calling bridge relay is released upon each such short circuiting of the loop the busy relay also causes a ground connected holding winding on the release delay relay to be connected to busy hold conductor 85, the other end of this conductor being connected to battery by common interrupter 161 during each flash interval.

In outgoing repeater 300 the aforementioned supervisory relay upon restoring in response to the first de-energization of the supervisory loop circuit causes this circuit to be permanently opened so that this relay itself is kept from reoperating and connector 500 and selector 400 are released at the end of the busy flash interval, that is as soon as holding battery is disconnected from busy hold conductor 85. Outgoing repeater 300 in office A is connected with interrupter 57 by means of a busy flash conductor 44 and a busy hold conductor 41, these conductors being similar in their function to the corresponding conductors 84 and 85 of interrupter 161 in office B. When the supervisory relay in repeater 300 releases as mentioned above, it also causes one winding of the calling bridge relay of this repeater, to be switched from direct ground to busy flash conductor 44 and causes a ground connected holding winding on the release delay relay of repeater 300 to be connected to the associated busy hold conductor 41. Consequently the calling loop extending back of repeater 300 to cord circuit 200 is periodically short-circuited at a rate of approximately 40 I. P. M. and the release of repeater 300 prevented, by virtue of busy hold conductor 41, each time the calling bridge relay restores in response to these short circuits. Furthermore on each of these intermittent deenergizations of the calling loop another supervisory relay which is included in this loop in cord circuit 200 releases to extinguish the supervisory loop associated with this cord circuit, thereby providing the operator with a slow flashing signal which is indicative of a busy condition.

Moreover, as the above mentioned winding of the calling bridge relay in repeater 300 is connected to busy-tone-superimposed ground between flash intervals an audible signal is returned from this repeater and the operator receives this tone signal if she listens in on the connection upon completion of the dialling operation. If the calling subscriber is switched through at this time he, too, will receive the busy tone signal.

It will be evident from the foregoing general description that after connector 500 has found the called subscriber's line busy a visual as well as audible busy signal is returned from outgoing repeater 300 while connector 500 and selector 400 are restored to normal, and that connector 500 is thereby made available again for further calls before the operator takes down the connection. Moreover, when the operator, upon noticing the busy condition, subsequently releases the remaining part of the connection by pulling the plug, there is no danger of outgoing repeater 300 being reseized by a new call before the automatic equipment in office B has had a chance to release as connector 500 is already released and selector switch 400 restored to normal at that time.

In the foregoing description it has been assumed that incoming second selector 400 found a trunk leading to an idle connector 500 in the desired group. Assuming on the other hand that all trunks in the selected level are busy, selector 400 is automatically stepped into an overflow position in the usual manner. In the embodiment of the invention more specifically described hereafter the changeover relay of the selector which after completion of the second digit of the called party's number causes the switch automatically to cut in on the selected level is reoperated to cause one winding of the calling bridge relay of this selector to be switched from ground to busy flash conductor 84. Also in this overflow position a holding winding of the release delay relay of selector 400 is brought under the control of busy hold conductor 85. In this manner busy flash and busy tone are returned from selector 400 and the release of this selector during the flash intervals is prevented, substantially as described above in connection with connector 500. Again outgoing repeater 300 responds to this busy signal by permanently opening the loop over trunk 15 to cause selector switch 400 to restore and by returning a busy flash signal, supplemented by busy tone, from local interrupter 57. When the operator upon thus being notified of the busy condition withdraws plug 30 outgoing repeater 300 and first selector 11 are also freed.

A connection from local subscriber S1 in office A to substation S2 in office B is completed in a manner similar to that described above in connection with a call from the operator at switchboard 10, except that in this case outgoing repeater 300 is seized by local first selector 13 after this selector has been connected with the calling subscribers line circuit 18 with the aid of line finder 12 and allotter 17. If the called subscribers line 16 is idle the polarized relay in outgoing repeater 300 operates responsive to the reversal of current over loop trunk 15 by the answering bridge relay in connector 500 upon answering of the called party as described above. As in the case of a call from switchboard 10, this polarized relay operates a current reversal relay which in turn reverses the polarity of the calling loop incoming to repeater 300, this calling loop in the instant case extending via the closed switch hook contacts in substation S1. In case of a call from an ordinary local subscriber such as subscriber S1 this last mentioned current reversal is without effect. However, as described in greater detail hereinafter the afore-mentioned polarized and current reversal relays in repeater 300 are instrumental in connecting and disconnecting a booster battery potential to and from the back control conductor of repeater 300 to operate the calling subscribers meter associated with line circuit 18; both the connecting and disconnecting is done in two steps of current, so that damage is avoided to the switching contacts involved.

Should the subscribers line 16 called by substation S1 be busy or should incoming second selector 400 encounter an all trunks busy condition in the selected level the equipment in office B is automatically released as described above and busy flash and busy tone are returned locally from outgoing repeater 300. In the case of a call from a local subscriber such as S1 the busy flash is without effect but receipt of the busy tone induces the calling subscriber to replace his receiver, thereby to release the remaining part of the connection.

In the embodiment described herein provisions are also made in connector 500 to momentarily apply booster battery to the back control conductor of the switch upon answering of the called subscriber, assuming again that line 16 of this subscriber was idle. This application of booster battery is ineffective in the case of a call, manual or automatic, incoming from office A but as more fully described hereafter is effective when connector 500 has been seized over the local switchtrain in office B to actuate the meter associated with the calling subscriber's line circuit. Such a call may originate at substation S3 in office B and include subscriber's line 189, line circuit 188, line finder 182 and selectors 183 and 185.

Referring now to Fig. 6, there is shown a telephone system incorporating another embodiment of the invention. The telephone system of Fig. 6 comprises two offices respectively designated C and D, these offices being interconnected by a carrier link 22 which is terminated in office C by a carrier terminal 21 and in office D by a carrier terminal 23. Associated with carrier terminal 21 is an outgoing repeater 700 which is accessible over a jack in the multiple of switchboard 10. Carrier terminal 23 in office D has associated therewith an incoming repeater 800 which in turn has individually associated therewith an incoming selector 400. This selector has access to groups of connectors 500 through which connection may be made to line circuits such as line circuit 20 which terminates line 24 of subscriber S4. There is also provided in office D a common interrupter 161 which is connected with both incoming selector 400 and connector 500 by way of a busy flash conductor 84 and a busy hold conductor 85. Incoming selector 400, connector 500 and interrupter 161 are respectively of the same type as the correspondingly designated circuits in Fig. 1. Similarly cord circuit 200 and operator's circuit 28 of switchboard 10, Fig. 6, are of the same type as the cord circuit 200 and operator's circuit 28 shown in Fig. 1.

It is assumed that link 22 is of the type including two carrier communication channels of which one serves to transmit audio frequencies such as speech over a two-wire interoffice trunk line in the direction from office C to office D while the other serves to transmit such audio frequencies in the reverse direction over this line. In addition to these communication channels two signalling channels are provided for the transmission of control signals of the off-and-on type from office C to office D and of supervisory signals of the off-and-on type from office D to office C. The arrangement may, for instance, be such that only two carrier frequencies are respectively provided for the transmission of all intelligence in the two directions of transmission; for instance, the first carrier frequency itself may serve as the control signal channel and its lower side band as the associated communication channel in one direction of transmission; and the second carrier frequency may itself serve as the supervisory signal channel and its lower side band as the associated communication channel in the opposite direction of transmission. A carrier system of this general type is disclosed for example, in Patent 2,559,165 to Molnar.

Assuming now that the operator at switchboard 10 in office C wishes to call substation S4 in office D, insertion of the calling plug of a cord circuit 200 into the calling jack associated with outgoing repeater 700 will result in the operation of the calling bridge relay of this repeater in a loop circuit which includes the above mentioned supervisory relay and polarized relay of cord circuit 200 in series, only the supervisory relay operating over that loop circuit at this time to light the supervisory lamp in cord circuit 200.

The operation of the afore-mentioned calling bridge relay brings about the operation of a Signal Out relay 760 in outgoing carrier terminal 21 which causes the carrier equipment in this terminal to steadily transmit the control signal carrier frequency over link 22. In response to the transmission of this signal frequency a normally operated Signal In relay 810 in incoming carrier terminal 23 is caused to release; and this causes a loop circuit extending over local trunk 158 to be closed in the associated incoming repeater 800, this loop circuit including in series, a supervisory relay and polarized relay in repeater 800 and a calling bridge relay in incoming selector 400, the last mentioned supervisory and calling bridge relays immediately operating in this circuit.

The operator now actuates the calling device associated with operator's circuit 28 in accordance with the first digit of the called party's number. Each opening of the impulse springs of this device results in an opening of the first mentioned loop circuit, a corresponding release of Signal Out relay 760 in carrier terminal 21, a corresponding interruption in the transmission of the control signal carrier frequency over link 22, a corresponding reoperation of Signal In relay 810 in carrier terminal 23, a corresponding opening of the second mentioned loop circuit and a corresponding release of the calling bridge relay of incoming selector 400. At the end of the first digit the wipers of selector 400 have been raised in the usual manner to a level giving access to the desired group of connectors 500 and the selector seizes and switches through to an idle one of these connectors. The final two digits similarly set this connector 500 on the bank contacts to which line circuit 20 terminating line 24 of substation S4 is connected.

Assuming first that the called subscriber's line 24 is idle, ringing current is automatically projected from connector 500 over this line and the bell at substation S4 is rung. When the subscriber at this station answers the call by removing his receiver from the switchhook the ring is stopped and the answering bridge relay in connector 500 operates in a conventional manner, causing the current in the loop extending from incoming repeater 800 to be reversed. The polarized relay included in this loop in repeater 800 thereupon operates, causing the operation of Signal Out relay 820 in carrier terminal 23 which in turn causes the carrier equipment in terminal 23 to transmit the supervisory signal carrier frequency back over link 22. In carrier terminal 21 at the other end a normally operated Signal In relay 770 restores in response to this carrier signal, thereby causing a reversal relay in outgoing repeater 770 to reverse the current over the loop circuit extending between this repeater and cord circuit 200. The above mentioned polarized relay in cord circuit 200, thereupon operates in response to this current reversal to extinguish the supervisory lamp as an indication that the call has been answered.

When the called subscriber at the end of the conversation replaces his receiver the various supervisory devices just referred to are returned to the condition in which they were before answering. More particularly the answering bridge relay in connector 500 restores, the carrier equipment in terminal 23 is caused to interrupt the transmission of carrier current of the supervisory signal frequency over link 22 and at the calling end of the connection, the polarized relay in cord circuit 200 is caused to release to again illuminate the supervisory lamp and thereby notify the operator of the termination of the call by the called subscriber. When the operator thereupon withdraws the plug, all the equipment involved in the connection returns back to normal.

Let it now be assumed that the line of called party S4 has been found busy by connector 500. In this case connector 500 functions to return both a flash busy signal and busy tone over its calling loop exactly as explained in connection with Fig. 1. During each flash busy interval, that is each time both legs of the last mentioned loop are connected to battery in the connector, the supervisory relay included in this loop in incoming repeater 800 releases, each time causing Signal Out relay 820 in carrier terminal 23 to operate. Each time this last mentioned relay operates the carrier frequency used for supervisory signals is supplied by the carrier equipment in terminal 23 and in response to each of these transmissions of carrier frequency the normally operated Signal In relay 770 in carrier terminal 21 is caused to restore and the above mentioned reversal relay in repeater 700 accordingly operated to reverse the direction of current flow over the loop extending over the calling side of repeater 700. On each of these current reversals the polarized relay in cord circuit 200 operates to darken the supervisory lamp associated with this cord circuit. As a result this supervisory lamp is flashed at the rate of operation of interrupter 161, that is approximately 40 I. P. M. In addition, busy tone is returned between flash intervals from connector 500 to carrier terminal 23 where it is impressed, by means of the modulation equipment provided in this terminal, on the carrier frequency used for the transmission of intelligence from office D to office C. With the aid of demodulation equipment provided in carrier terminal 21 the busy tone is then separated in this equipment and transmitted over the calling loop extending back to cord circuit 200 over which circuit it is then received in the headphones associated with operator's circuit 28. For detals regarding the transmissoin of audio frequencies over the carrier link reference is made to the above mentioned patent to Molnar.

In the embodiment of the invention according to Fig. 6, the equipment in the distant exchange, in this instance office D, is not released in response to the receipt of the flash busy signal at the originating end. However, in accordance with one feature of the invention the aforementioned reversal relay in outgoing repeater 700 is ararnged during each of its operations to hold the release delay relay of repeater 700 and Signal Out relay 760 of carrier terminal 21 in operated condition. In this manner the transmission of the steady control signal over carrier link 22 in the forward direction is prevented from being discontinued and accordingly the transmission of any busy flash signal element over this link in the reverse direction prevented from being prematurely cut off even though the operator upon noticing the busy signal pulls the plug during a flash interval, thereby releasing the calling bridge relay. Also due to the aforementioned holding of the release delay relay of repeater 700 during each flash interval, repeater 700 is maintained busy in the jack and busy lamp multiple of switchboard 10 so that seizure of this repeater in a new call is prevented until the end of each flash interval. This guards against a new seizure of the outgoing repeater while the switching equipment at the distant end is still locally held by holding battery supplied from interrupter 161 during the flash interval as explained above in connection with Fig. 1.

If the busy flash signal instead of originating in connector 500, if the called line has been tested busy, comes up in incoming selector 400 in response to an overflow condition in this selector, the operation of the telephone system of Fig. 6 is similar to that just described.

*Call from switchboard 10 in office A to substation S2 in office B*

Having described the operation of the telephone systems according to Figs. 1 and 6 in general terms, a more detailed description will now be given of the manner in which the various calls involving offices A and B, Fig. 1, and C and D, Fig. 6, are extended.

Figure 2:
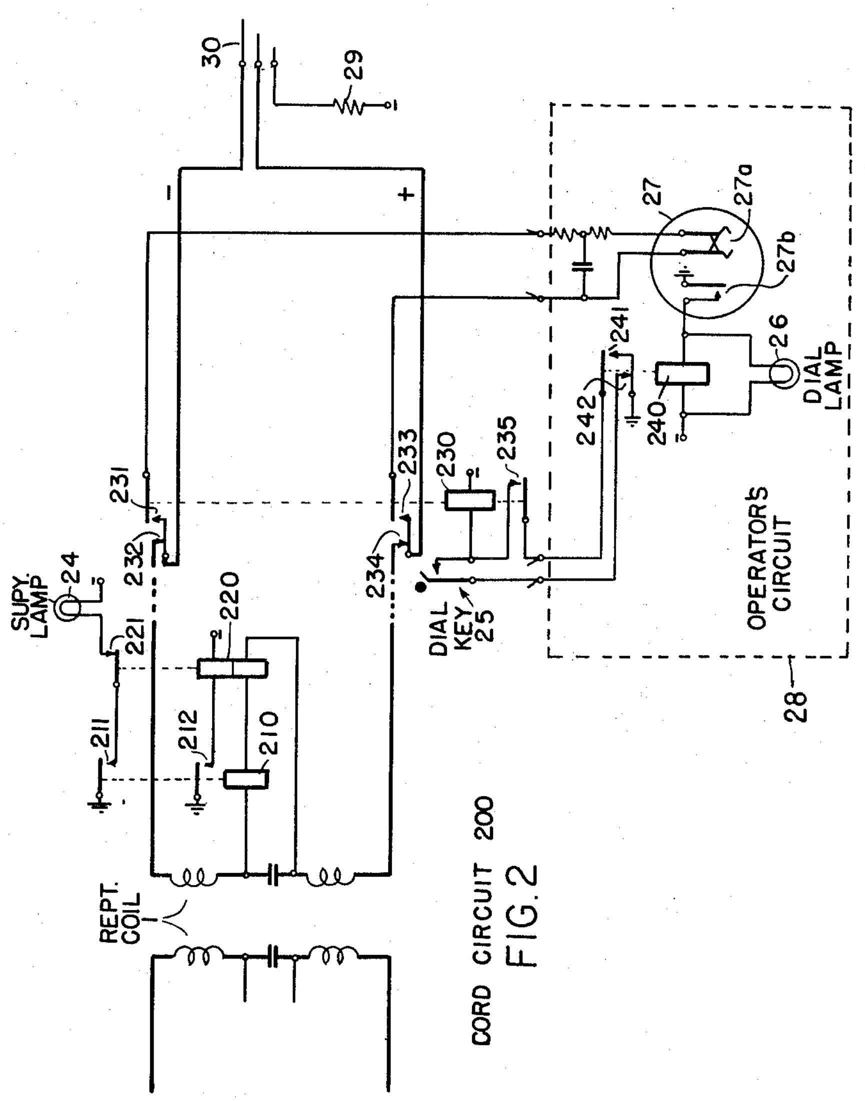

Let it be assumed first that the operator at switchboard 10, Fig. 1, has received a call from a subscriber in office A or in a distant office and has answered this call by means of the answering plug, not shown, of cord circuit 200, Figs. 1 and 2. The operator then ascertains from the calling subscriber the number of the called party in the usual manner, and then proceeds to insert the calling plug 30 of cord circuit 200 into the jack of the switchboard multiple which is associated with first selector 11, Fig. 1, assuming the operator has found this selector idle by making the well-known click test. First selector 11 may be of any suitable type and may be, for example, of the same kind as selector 400, Fig. 1, the circuit of which is shown in detail in Fig. 4.

Upon insertion of calling plug 30, a calling loop is closed to the line relay, not shown, in first selector 11, this loop extending from ground through one winding of the afore-mentioned line relay, ring of switchboard jack and plug 30, contact 234, Fig. 2, lower right hand winding of repeat coil 1, lower winding of polarized relay 220, winding of supervisory relay 210, upper right hand winding of repeat coil 1, contact 232, tip of plug 30 and switchboard jack, and the other winding of the line relay of first selector 11 to battery. The selector line relay and supervisory relay 210, Fig. 2, operate in this loop circuit. The line relay in selector 11 causes ground to be closed to the sleeve of the switchboard jack in a well-known manner, thereby rendering this selector busy in the switchboard multiple. Supervisory relay 210, in operating, at its contact 211 closes the circuit of supervisory lamp 24 through contact 221 of relay 220, thereby lighting this lamp; and at contact 212 closes a circuit through the upper or polarizing winding of relay 220. However, as the two windings of relay 220 are energized in an opposing sense, relay 220 does not operate at this time.

The operator now actuates the dial key 25 associated with cord circuit 200. Actuation of dial key 25 closes an obvious circuit to relay 230. This relay upon operating at its contact 235 prepares a locking circuit for itself and at its make before break contacts 231, 232 and 233, 234 switches the tip and ring of plug 30 from repeat coil 1 to impulse springs 27*a* of a calling device or dial 27 which forms a part of operator's circuit 28 also shown in Fig. 2. Supervisory relay 210 releases, thereby extinguishing supervisory lamp 24. The operator next proceeds to dial the number of the called party. When dial 27 after having been wound up in accordance with the first digit of this number leaves its normal position, off normal springs 27*b* close an obvious circuit to dial lamp 26 and relay 240 in parallel. Dial lamp 26 is lit and relay 240 operates to complete the above mentioned locking circuit for relay 230.

As the dial returns to normal, impulse springs 27*a* interrupt the loop to first selector 11, a given number of times corresponding to the first digit of the called subscriber's number. The line relay of first selector 11 responds to these impulses in a well-known manner by causing the wipers of the switch to be raised a corresponding number of steps to the desired level. Selector 11 then then cuts in on this level automatically in search for an idle trunk, such as trunk 14, leading to repeaters which terminate the trunks outgoing to office B. After this trunk 14 has been seized, selector 11 switches the calling loop through to outgoing repeater 300 in a well-known manner free of attachments in selector 11 so that calling bridge or line relay 340, Fig. 3, operates in the following circuit: ground, contact 374, upper winding of relay 340, contact 315, positive conductor 32, local trunk 14, positive wiper and switching contact, not shown, of first selector 11, ring of switchboard jack and plug 30, contact 233, dial impulse springs 27a, contact 231, tip of plug 30 and of switchboard jack, switching contact and negative wiper of first selector 11, negative conductor 31 of local trunk 14, contact 313, lower winding of relay 340, battery.

When dial 27, Fig. 2, returns to normal after transmission of the first digit, off normal springs 27*b* open so that dial lamp 26 is extinguished and relay 240 releases. At contact 241 the locking circuit of relay 230 is thereby opened but relay 230 remains operated through contacts 242 provided dial key 25 is still thrown. When relay 240 reoperates at the beginning of the next actuation of the dial, ground on the make spring of contact 241 is again transferred from the operating circuit to the holding circuit of relay 230 and transferred back from the holding circuit to the operating circuit of this relay when the dial again reaches its normal position. It will easily be seen, therefore, that in view of the circuit arrangement of relays 230 and 240, relay 230 which controls the connection of dial 27 to cord circuit 200, cannot be operated by actuation of dial key 25 unless dial 27 is at normal and cannot be released in spite of premature restoration of this key as long as the dial is still off normal incident to the transmission of any digit of the called party's number. Mutilation of digits is thereby effectively prevented.

Returning now to the operation of line relay 340 of repeater 300, Fig. 3, upon switch through of first selector 11 in the interval between the first and second digits, this relay, upon operating over the loop circuit traced above, at its contact 343 closes an obvious circuit to release delay relay 330. At the same contact relay 340 closes circuits extending through contacts 376 and 362 and the winding of slow to release relay 360 to battery, and yet another circuit which extends from ground at contact 343 through contact 378 and slow to release relay 390 to battery. At contact 342 relay 340 closes a point in a loop circuit extending over conductors 77, 78 of interoffice trunk 15.

Relay 330, in operating, at its contact 332 closes an obvious circuit to slow to release relay 370; at contact 335 relay 330 opens a point in a circuit extending over all trunks busy conductor 34 to provide for all trunks busy metering in a manner well known in the art; and at its contact 334 the relay connects ground through contact 353 of relay 350 and contact 37 of busy key 35 to back control conductor 33 to hold the preceding equipment and also at contact 334 closes a direct circuit to the upper or polarizing winding of polarized relay 350, this relay being designed to operate only if both relay windings are energized in an aiding sense. Since the lower winding of relay 350 is still open this relay does not operate at this time.

Relay 390 also operates and, in so doing, at its contact 392 prepares an alternative direct ground connection for the upper winding of relay 340 and at contact 393 closes another point in the outgoing loop circuit. Relay 360, upon its operation, at its preliminary or *x* contact 365 closes a point in a metering circuit extending from a 50 volt booster battery through conductor 45 as more fully described hereafter; at contact 361 it closes a locking circuit for itself which extends through contacts 311 and 332 to ground; and at contact 362 the relay opens its original operating circuit. Turning finally to the operation of relay 370 upon closure of contact 332, this relay at its contact 371 disconnects the lower winding of busy-back relay 380 from negative conductor 77 of interoffice trunk 15; at contact 372 completes the loop circuit over this trunk which may be traced from ground through contacts 443 and 452 in incoming selector 400, Fig. 4, lower winding of line relay 420, contact 413, trunk conductor 78, contacts 342, 324 and 393, Fig. 3, winding of supervisory relay 385, lower winding of relay 350, contacts 326 and 372, trunk conductor 77, contacts 73 and 411, Fig. 4, winding of line relay 420 to battery; at its contacts 373, 374, relay 370 switches the upper winding of relay 340 from direct ground at the break spring of contact 374 to direct ground at the make spring of contact 392; at contact 375 the relay closes a multiple ground to the polarizing winding of relay 350; at contact 376 it opens another point in the operating circuit of relay 360; at contact 378 it opens the operating circuit of relay 390; and at contact 377 it prepares another circuit for this last mentioned relay.

Polarized relay 350 does not operate in the last-mentioned loop circuit as the current flow over the lower or line winding of this relay is in such a direction at this time that the two windings set up opposing fields. Assuming that there is no disconnection anywhere in trunk conductors 77, 78, supervisory relay 385 operates over the loop circuit and at contact 386 closes an alternative circuit to slow to release relay 390 before the relay had sufficient time to restore. Calling bridge or line relay 420 in incoming selector 400, Fig. 4, also operates in the afore-mentioned loop circuit, closing at its contact 421 a circuit extending from ground at contacts 415 through contact 421 and the upper winding of release delay relay 430 to battery. Relay 430 on operating at its contact 431 closes ground by way of contact 441 to back control conductor 79 to hold the preceding equipment operated in case selector 400 is used as a local selector. Since in the present instance selector 400 serves as an incoming selector, no equipment is connected to back control conductor 79 so that the afore-mentioned connection of ground to this conductor is without effect. At its contact 432 relay 430 prepares a circuit to the upper winding of transfer relay 450 and at its contact 434 it closes a circuit extending through the lower winding of relay 450, over supervisory battery conductor 76 and a common supervisory relay, not shown, which is connected to the other end of this conductor, to battery.

Transfer relay 450 which is of the slow releasing variety, at its contacts 451, 452 switches the lower winding of line relay 420 from direct ground to the conductor marked dial tone and ground, by way of rotary-off-normal contact 65. When the selector switch the circuit of which is shown in Fig. 4, is used as a local first selector, for instance, in the place of local first selector 13 or 183, Fig. 1, the other end of the afore-mentioned conductor is connected to a grounded dial tone source so that the calling subscriber is given an indication when the automatic equipment is ready to receive the first digit. As in the instant case the selector shown in Fig. 4 serves as an incoming selector the dial tone signal may be omitted and the above mentioned conductor connected to direct ground instead.

The apparatus is now in a condition to receive the second digit of the called subscriber's number. The operator, therefore, actuates her calling device in accordance with this digit whereupon the calling loop extending to line relay 340, Fig. 3, is interrupted at impulse springs 27*a* a corresponding number of times.

Upon the first release of relay 340 the loop circuit extending over trunk 77, 78, is opened at contacts 341, 342 so that supervisory relay 385, Fig. 3, and line relay 420, Fig. 4, is restored. At contact 343 relay 340 opens the circuit of relay 330 but this circuit is re-closed at the end of the first and each following impulse so that relay 330 due to its slow release characteristic is prevented from releasing during the impulse series. When relay 340 restores on the first and each following impulse of the series it closes at its contact 344 the following circuit for slow to release relay 320: ground, contacts 344, 395, 333, 351, winding of relay 320, battery. As relay 330 is of the slow releasing type the relay remains operated during the whole series of impulses. Relay 320, upon operating, at its contacts 321, 322 switches the make spring of impulse contact 341 in the negative leg of the interoffice trunk from condenser 51 to ground through resistor 40 preparatory to the next operation of relay 340; and at its contact 323, 324 similarly switches the make spring of impulsing contact 342 in the positive leg of the trunk from condenser 52 to battery through resistor 46. At contact 326 relay 320 disconnects the winding of supervisory relay 385 and the line winding of polarized relay 350 from the trunk to further improve impulsing conditions; and at contact 327 it closes an alternative circuit extending over contact 377 for relay 390 to prevent the release of this relay incident to the opening of contact 386 upon the release of supervisory relay 385.

Upon the first and each following re-operation of line relay 340 contacts 341 and 342 re-close to respectively connect the afore-mentioned resistance ground and resistance battery to the negative and positive leg of the trunk, whereby line relay 420 in incoming selector 400 is re-operated each time. It will readily be seen that this "battery dialling" method reduces the resistance over which the line relay at the distant end has to operate at the end of each impulse as compared with the conventional loop dialling method.

When line relay 340, Fig. 3, remains operated at the end of the impulse series, relay 320 releases, switching at its contacts 321, 322 the negative trunk leg from resistance ground back to line condenser 51 and switching at its contacts 323, 324, the positive trunk leg from resistance battery back to line condenser 52. It will be noted that upon re-closure of contact 326 the winding of relay 385 and the line winding of relay 350 are shunted over resistor 47 and remain so shunted until contact 325 and the other make contacts of relay 320 open at the end of the release action of this relay at which time supervisory relay 385 is permitted to reoperate over the trunk loop. The above mentioned shunting circuit serves to prevent the operation of relays 385 or 350 from the afore-mentioned resistance ground and resistance battery during the release of relay 320.

At the distant end of the trunk line relay 420 releases in response to the "battery dialling" impulses received from repeater 400. When relay 420 releases, its contact 421 opens the above traced circuit through relay 430 but this relay by virtue of its slow to release characteristic is prevented from releasing during these impulses; contact 422 closes a circuit for vertical magnet 470 and the upper winding of relay 450 in parallel, this circuit extending from ground through contacts 415, 422, 432, rotary off normal springs 64 and from there through vertical magnet 470 to battery and in multiple therewith, through the upper winding of relay 450 to battery.

In response to each actuation of vertical magnet 470 the wipers of selector 400 are moved one step in the vertical direction. On the first vertical step of the selector switch, the vertical off normal contacts are actuated by the switch shaft so that at contact 61 the circuit through the lower winding of transfer relay 450 is opened and the following circuit for rotary stepping relay 460 is closed at vertical off normal contact 63: ground, contacts 431, 454, 63, winding of relay 460, battery.

Relay 460 which operates in this circuit at its contact 461 closes a locking circuit for relay 460 independently of contact 454 of transfer relay 450, this locking circuit extending from ground through contacts 415, 461, 481, 63 and winding of relay 460 to battery; at contact 462 relay 460 prepares a circuit for rotary magnet 480.

At the end of this series of impulses the wipers of selector 400 have been elevated to the desired level. When line relay 420 remains operated at the end of this impulse series relay 450 releases, closing at its contact 455 the following circuit to rotary magnet 480: ground, contacts 431, 455, 462, rotary magnet 480, battery. Rotary magnet 480, upon operating, moves the wipers of selector switch 400 into engagement with the first contact set in the selected level and actuates its interrupter contact 481 whereby the above traced locking circuit of relay 460 is opened. Also on the first rotary step of the selector switch, rotary off normal contacts 64, 65, 66, are actuated by a cam mounted on the switch shaft, the corresponding mechanical arrangement being well known in the art. Relay 460, upon restoring at its contact 461 opens another point in the locking circuit of relay 460 and at its contact 462 opens the circuit of rotary magnet 480. The last mentioned magnet accordingly restores re-closing its interrupter contact 481.

The further operation of selector 400 depends on whether the afore-mentioned first set of contacts in the selected level is busy or idle. If it is busy, ground encountered by test wiper 83 re-operates relay 460 in the following circuit: ground on bank contact engaged by wiper 83, contacts 417, 481, 63, winding of relay 460, battery. Furthermore, in view of the last mentioned ground and in view of ground at contact 431, switching relay 410 is short-circuited and thereby prevented from operating. Relay 460, upon reoperating, at contact 461 locks independently of ground applied over wiper 83 and at contact 462 re-closes the circuit of rotary magnet 480. This magnet thereupon moves the switch wipers into engagement with the second contact set in the selected level and again actuates its interrupter contact 481, thereby opening the locking circuit of relay 460. Consequently, relay 460 restores, in turn releasing rotary magnet 480.

This interrupter action between relay 460 and magnet 480 as well as the corresponding rotary stepping action of the switch wipers repeats itself as long as ground is encountered by test wiper 83. Assuming that the switch wipers have been brought into engagement with a set of contacts to which an idle connector such as connector 500, Figs. 1 and 5, is connected, switching relay 410 operates in the following circuit in view of the absence of shorting ground from test conductor 96: ground, contact 431, cam springs 68, winding of switching relay 410, contacts 481 and 63, winding of relay 460, battery. As the winding of relay 410 is of high resistance compared with that of relay 460 the latter relay cannot operate in this circuit. Relay 410, in operating, at its contact 415 opens another point in the locking circuit of relay 460; at contacts 417, 416, switches test wiper 83 from the right hand terminal to the left hand terminal of the winding of switching relay 410, thereby extending the ground at contact 431 of relay 430 to test wiper 83 and preparing a holding circuit for this relay which extends back over the test wiper as explained below; at contacts 411, 413, relay 410 disconnects the windings of line relay 420; and at contacts 412 and 414 it switches interoffice trunk 77, 78, through to wipers 81, 82 of the selector switch. Relay 420, in restoring, at contact 421 opens the circuit of the upper winding of relay 430; and when relay 430 releases after a slight delay it removes, at contact 431, the ground from the left hand terminal of the winding of switching relay 410 so that this relay now relies on holding ground returned by the succeeding equipment over test wiper 83 as described below.

As soon as selector 400 has switched through as just described, calling bridge relay 520 of connector 500, Fig. 5, operates in the following loop circuit: ground, contact 92, Fig. 5, contact 571, lower winding of relay 520, contact 514, conductor 95, selector wiper 82, Fig. 4, contact 414, conductor 78 of interoffice trunk 15, contacts 342, 324, 393, Fig. 3, winding of relay 385, lower winding of relay 350, contacts 326 and 372, conductor 77 of trunk 15, contacts 73 and 412, Fig. 4, selector wiper 81, conductor 94, contact 512, Fig. 5, upper winding of relay 520, battery. At contact 521, relay 520 closes an obvious circuit to the lower winding of release relay 540 and, in parallel thereto, through vertical-off-normal contact 108 to the upper winding of slow-releasing relay 550.

Relay 540, in operating, at its contact 543 connects ground through contact 519 of relay 510 and contact 103 of busy key 101 to back control or test conductor 96 to hold the preceding equipment, that is, in the present instance, switching relay 410 of selector 400.

It may be mentioned at this point that busy key 101 enables the office attendant to make connector 500 busy in the selector banks, for instance, if the connector is out of order. When busy key 101 is thrown ground is connected to control conductor 96 at contact 102 and at contact 103 the remaining switching equipment in the connector is disconnected from that conductor.

When relay 550 operates over the path traced above it prepares, at its contact 552, a circuit to vertical magnet 129 in parallel with the lower winding of relay 550.

The operator now actuates her calling device 27, Fig. 2, in accordance with the third digit of the called subscriber's number. As in the case of the second digit, the impulses transmitted by impulse springs 27*a* of dial 27 are repeated at contacts 341, 342 of relay 340 of outgoing repeater 300 except that in the present instance the "battery dialling" impulses transmitted by the last mentioned two contacts over interoffice trunk 77, 78 are received by line relay 520 of connector 500.

Upon the first and each following release of relay 520 in response to these pulses, the circuit to relay 540 is opened at contact 521 but this relay due to its slow-release characteristic remains operated during the impulse series; and at contact 522 a circuit is closed through contacts 545 and 552 to the lower winding of relay 550 and, in parallel to this winding, through contact 585 to vertcial magnet 128 and battery.

In response to the impulses received from contact 522 of line relay 520, vertical magnet 129 raises the wipers of connector 500 a number of steps corresponding to the number of impulses in the series. Upon the first vertical step of the switch shaft vertical-off-normal contacts 108, 109 and 110 are actuated. Vertical-off-normal contact 109 closes a point in the operating circuit of slow-to-release relay 580; and contact 108 opens the circuit through the upper winding of relay 550. However, as the circuit through the lower winding of this relay is closed, at contact 522, on each release of line relay 520, relay 550 remains operated throughout the impulse series.

When line relay 520 remains in operated condition at the end of the series of impulses, relay 550 releases, closing at its contact 554 the following circuit to relay 580: ground, contact 521, rotary-off-normal contact 107, contact 554, vertical-off-normal contact 109, winding of relay 580, battery. Relay 580, upon operating in this circuit, at its contact 584 closes a point in the operating circuit of busy relay 570; at its contacts 585, 586 it switches the impulsing circuit from vertical magnet 129 to rotary magnet 131, this circuit being open at contact 522 at this time; at contact 587 the relay prepares a locking circuit for relay 580; and at its contact 588 it closes the following alternative circuit for the upper winding of relay 550; ground, contacts 521, 107, 588, 567, upper winding of relay 550, battery. When relay 550 operates in this last mentioned circuit, it opens, at its contact 551, a point in the operating circuit for busy relay 570 and at contact 553 completes the following locking circuit for relay 580: ground, contacts 543, 587, 553, 109, winding of relay 180, battery.

The operator now actuates dial 27 in accordance with the fourth or final digit of the called party's number, whereby the impulses transmitted by dial impulse springs 27*a* are again repeated by repeater 300, the repeated impulses being received by line relay 520 of connector 500. When this relay restores in response to the first and each following impulse of this series, the circuit of relay 540 is opened at contact 521 as before, but this last mentioned slow-to-release relay does not restore in response to these short numerical impulses. Upon each restoration of line relay 520, the following circuits are closed at contact 522 of this relay: ground, contacts 522, 545, 552, and from there through the lower winding of relay 550 to battery, and in parallel therewith, through contact 586 and rotary magnet 131 to battery.

The rotary magnet on its first actuation causes the wipers of connector switch 500 to be brought into engagement with the first set of contacts in the level selected in accordance with the preceding digit. Also on the first rotary step of the switch, rotary-off-normal contact 107 is actuated, whereby the above-traced circuit through the upper winding of relay 550 is opened, this relay, however, being held over its lower winding throughout the series of impulses.

At the end of this last impulse series the wipers of connector switch 500 have been arrested on the set of bank contacts associated with line circuit 19 of substation S2, Fig. 1, and the circuit through the lower winding of relay 550 is permanently broken at contact 522 of line relay 520, whereby the vertical and rotary magnets are permanently disconnected from impulsing contact 522 and relay 550 is caused to restore. This last mentioned relay, upon releasing, at its contact 552 opens another point in the locking circuit of relay 550; at its contact 551 the relay connects test wiper 123 of connector 500 to busy relay 570 over a path extending over contact 551, make contact 584 of relay 580, make contact 544 of release delay relay 540 and break contact 598 of switching relay 590; and at contact 553, relay 550 opens the locking circuit of relay 580 so that this relay releases slowly and upon restoring opens the above-traced connection of busy relay 570 to test wiper 123. From the foregoing description it will be seen that busy relay 570 is disconnected from test wiper 123 throughout the rotary motion of the switch and is thereafter momentarily connected to this wiper for a busy test interval corresponding to the release time of relay 580.

At the switchboard end of the connection, the operator restores her dial key 25, Fig. 2. Therefore, when dial 27 has returned to normal after transmission of the final digit, the opening of dial off-normal contact 27*b* causes dial lamp 26 to be darkened and relays 340 and 330 to be released. Relay 230 upon restoring, at contacts 231, 232 and 233, 234 transfers the tip end ring of plug 30 from dial 27 back to the right-hand windings of repeat coil 21. Consequently, supervisory relay 210 reoperates over the calling loop extending to repeater 300, thereby again energizing the polarizing winding of relay 220 at contact 212 and re-closing the circuit to supervisory lamp 24 to light this lamp.

Reverting again to the operation of connector 500, if line 16 of subscriber S2 is idle battery is connected through the cut-off relay, not shown, of line circuit 19, Fig. 1, to the bank contact engaged by test wiper 123, Fig. 5, so that busy relay 570 cannot operate in the afore-mentioned busy test interval. Upon the restoration of relay 580 the following operating circuit is then closed for switching relay 590; ground, contact 543, break contact 574 of busy relay 570, lower winding of switching relay 590, break contact 582 of relay 580, contact 551 of relay 550, test wiper 123 and bank contact engaged thereby, winding of the cut-off relay in the called subscriber's line circuit 19, battery. When relay 590 operates in this circuit it closes at contact 596 the locking circuit for switching relay 590 which extends from ground at contact 542; at contact 595 the relay connects ground to test wiper 123 to mark the called line as busy in the connector banks; at its contact 598 it opens another point in the circuit of busy relay 570; at contact 597 it prepares an alternative locking circuit for relay 580; at its contact 594 it prepares a point in the circuit of metering relay 530; at contact 592 it completes a ringing circuit which may be traced from the battery connected ringing generator, not shown, through generator and battery conductor 99, lower winding of relay 560, contacts 561 and 592, connector wiper 121 and bank contact engaged thereby, negative conductor of the subscriber's line, ringer and condenser, not shown, at called substation S2, positive conductor of the subscriber's line, bank contact and wiper 122 of connector 500, and contacts 593 and 564 to ground; and at contact 591, relay 590 connects ring-bank-tone conductor 127 through contact 563 to the calling side of the connection. This ring-back-tone advises the operator at switchboard 10 if her listening key, not shown, is thrown, or the calling subscriber if the talking circuit is switched through in cord circuit 200, that ringing current is being transmitted.

The condenser in series with the ringer at substation S2 prevents the flow of direct current over the circuit just traced so that ring cut-off relay 560 which is slow-to-operate does not operate in response to this ringing current. However, when the subscriber at substation S2 answers the call by lifting the receiver, a direct current loop is closed over the called subscriber's line and the switchhook contacts at station S2, and relay 560 now operates in a circuit extending from ground at the break spring of contact 564 through this loop and the afore-mentioned ringing generator to battery. Relay 560, in operating, at its contact 568 closes a locking circuit for relay 560 extending from ground at contact 542 through contact 568 to the upper winding of relay 560; at contacts 561 and 564, relay 560 opens the ringing circuit; at contacts 562, 565 it switches the talking circuit through and at contact 563 it opens the ring-back-tone circuit.

The following circuit is now closed for answering bridge relay 510 in connector 500: ground, lower winding of relay 510, contacts 565 and 593, connector wiper 122 and bank contact engaged thereby, positive side of the called subscriber's line, switchhook contacts at substation S2, negative side of the called subscriber's line, bank contact and wiper 121 of connector 500, contacts 592 and 562, upper winding of relay 510, battery. Relay 510 operates in this circuit and in doing so at contacts 511, 512 and 513, 514 reverses the current over the loop incoming to the connector; at contact 515, the relay closes a circuit for slow-to-release relay 530 extending from ground through contacts 594, 566, 515, 581, and 541 and the winding of relay 530 to battery, a multiple ground from contact 542 being closed to this relay winding at contact 516 of relay 510; and at make-before-break contacts 518 and 519, relay 510 switches back control conductor 96 which is connected to the make springs of these contacts by way of contact 103 of busy key 101, from ground through contacts 543 and 519 to ground through contacts 542, 534 and 518, this switching operation being preparatory to a momentary application of booster battery to the last mentioned conductor as will be described forthwith.

When relay 530 operates in the afore-mentioned circuit, it closes, at its preliminary or *x* contact 532 the following circuit: ground, 50-volt booster battery, conductor 125, protective resistor 106, limiting resistor 100, preliminary contact 532, contacts 534 and 543, ground. It will be noted from Fig. 5 that the negative terminal of the booster battery is grounded while its positive terminal is connected to conductor 125.

As the armature of relay 530 continues its travel, break contact 534 opens the connection to ground at contact 543 so that the booster battery circuit now extends as follows: ground, booster battery, conductor 125, protective resistor 106, limiting resistor 100, preliminary contact 532, contacts 518 and 103, conductor 96, test wiper 83 of selector 400, Fig. 4, contacts 416, 68, switching relay 410, contact 481, vertical-off-normal contact 63, relay 460, battery. As the armature of relay 530 continues its stroke further, limiting resistor 100 is short-circuited by the closure of make contact 533 so that apart from protective resistor 106 which is of low resistance there is now a direct connection between the booster battery and conductor 96.

In the circuit last traced, the regular exchange battery and the 50 volt booster battery are in series connection so that a relatively heavy current flows over this circuit; and it is to avoid damage to the switching contacts of relay 530 due to this heavy current that the booster battery is thus applied to conductor 96 in two steps of current, namely, first through limiting resistor 100, and then, substantially directly, through shorting contact 533. The purpose of applying booster battery to control conductor 96 is to actuate a message register when connected to the control conductor in a calling subscriber's line circuit as will be more further described hereafter in connection with an intraoffice call. In the instant case involving a call from the operator at switchboard 10 over interoffice trunk 15, the control conductor does not extend back beyond incoming selector 400 and the connection of booster battery, therefore, is without effect in this type of call, switching relay 410, Fig. 4, merely being held operated in the booster battery circuit traced above.

Relay 530 at its make contact 531 also causes the re-operation of slow-to-release relay 580 over an obvious circuit and the last mentioned relay, in operating, at its contact 581 opens the circuit of relay 530 so that this relay releases after a slight delay. At its contact 584, relay 580 closes an independent locking circuit for itself, which circuit may be traced from ground through contacts 595, 551, 584, 544 and 597 and the winding of relay 580 to battery.

Relay 530, in releasing, at make contact 531 opens the afore-mentioned operating circuit of relay 580; and at make contact 533 opens the short circuit of limiting resistor 100 whereby this resistor is again introduced into the booster battery circuit to reduce the current therein. As relay 530 continues its release operation, break contact 534 of relay 530 re-connects ground from contact 543 of relay 540 to back control conductor 96 and, finally preliminary contact 532 opens the circuit extending from booster battery through protective resistor 106, limiting resistor 100 and contacts 532 and 534 of relay 530 to ground at contact 543. In this manner booster battery is also disconnected from conductor 96 in two current steps to prevent damage to the contacts of relay 530 due to arcing.

Reverting again to the reversal of current flow on the calling side of connector 500 due to the actuation of contacts 511, 512 and 513, 514 of relay 510 upon answering of the called party, this current reversal will reverse the field set up by the line winding of polarized relay 350 of repeater 300, Fig. 3, so that relay 350 operates. This relay, upon operating, at contact 354 closes an obvious circuit to relay 310 which, due to its slow-to-operate characteristic, actuates its contacts after a slight delay. Upon closure of make contact 352 of make-before-break combination 352, 353 of relay 350 and prior to the opening of break contact 353 of this combination, the following circuit is closed: ground, 50 volt booster battery, conductor 45, protective resistor 48, preliminary or *x* contact 365 of relay 360, limiting resistor 42, contacts 352, 353, contact 334, ground. When at the end of the armature stroke of relay 350, contact 353 also is actuated, the last traced circuit is opened and booster battery is now connected through protective resistor 48, preliminary contact 365, limiting resistor 42, contact 352, contact 37 of busy key 35 to back control conductor 33. When relay 310 operates it short circuits limiting resistor 42 through contact 365 of relay 360, contact 316 of relay 310 and contact 366 of relay 360 so that there is now a substantially direct connection from booster battery to conductor 33 by way of protective resistor 48, this latter resistor being of relatively low resistance.

In Fig. 3, there is schematically indicated apparatus designated by numerals 171–175 and including, particularly a message register 174 in series connection with resistor 175, such apparatus being connected to back control conductor 33 in the preceding equipment if the call originated at a local substation such as S1, Fig. 1, in office A; this type of call will be described in a later section. On the other hand, in a call from or through switchboard 10 in office A as now described, the only apparatus connected to this conductor is the equipment in the holding circuit of first selector 11, Fig. 1, which may be assumed to include a relay similar to switching relay 14 of selector 400, Fig. 4, and, in parallel thereto, resistor 29 which is connected to the sleeve of plug 30, Fig. 2. Consequently, when in the instant case booster battery is applied to conductor 33 in two steps as just described, the booster battery circuit extends over this conductor through the switching relay, not shown, of first selector 11, Fig. 1, to battery and, in parallel therewith, through the sleeve of switchboard jack and plug and resistor 29, Fig. 2, to battery. This two-step application of booster battery avoids damage to the switching contacts of relay 350 which might result if the relatively heavy booster battery current consequential to the series connection of this battery with the exchange battery in the booster battery circuit, were permitted to flow through these contacts in its full strength immediately. As the switching relay of first selector 11 is energized in the booster battery circuit, this relay does not release during the application of this battery.

Reverting now to the operation of reversal relay 310, this relay, upon operating, at its contact 311 also opens the locking circuit of slow-to-release relay 360 so that this relay restores after a slight delay. Upon the opening of make contact 366 of relay 360, the above mentioned short circuit of limiting resistor 42 is opened, so that the booster battery circuit again extends to conductor 33 through this resistor and the current flowing over the booster battery circuit is correspondingly reduced. Upon further travel of the armature of relay 360, contact 367 of this relay re-closes whereby the back control conductor is connected to ground through contacts 352, 367, and 334 and the following circuit closed: ground, booster battery, conductor 45, protective resistor 48, *x* contact 365, limiting resistor 42, contacts 367 and 334, ground. This circuit is opened when *x* contact 365 is opened near the end of the armature stroke of relay 350.

Reversal relay 310, upon operating, at its contacts 312, 313 and 314, 315 also reversed the polarity of the calling loop extending through supervisory relay 210 and the line winding of polarized relay 220 in cord circuit 200, Fig. 2. With the line current now traversing this winding in an aiding direction, polarized relay 220 operates to open, at its contact 221, the circuit of supervisory lamp 24. This lamp accordingly is extinguished and the operator thereby provided with an indication that the call has been answered.

Let it be assumed that at the end of the conversation the called subscriber S2 is the first to replace his receiver so that back bridge relay 510 in connector 500 releases. At contact 517 of this relay a circuit is closed from ground through contacts 594, 566, 517, supervisory–1 conductor 97 and a corresponding supervisory–1 lamp, not shown, which is connected to the other end of this conductor to battery. This supervisory–1 lamp is illuminated in the circuit as a warning that the connector is still held by the calling party although the called party has released. At contacts 511, 512, and 513, 514 the polarity of the loop circuit extending over the interoffice trunk is reversed back to normal so that polarized relay 350 in repeater 300 restores as its two windings again set up opposing fields. Relay 350 at contact 354 opens the circuit of reversal relay 310 which, in releasing, at its contacts 312, 313 and 314, 315 reverses the direction of current flow over the supervisory loop extending back to cord circuit 200. Polarized relay 220, Fig. 2, accordingly releases, thereby again lighting supervisory lamp 24 as an indication that the called subscriber has hung up.

The operator upon noticing the supervisory lamp, withdraws plug 30 thereby opening the loop circuit extending over local trunk 14. Consequently, supervisory relay 210 in cord circuit 200 releases, causing supervisory lamp 24 to be extinguished, and line relay 340, Fig. 3, restores at the other end of the loop. Relay 340, upon releasing, at its contact 342 opens the loop circuit extending over interoffice trunk 15 and at contact 343 permanently opens the circuit of release delay relay 330. The latter relay, upon restoring after a short interval, at its contact 334 removes holding ground from control conductor 33 to bring about the release of first selector 11, Fig. 1 in a well known manner; at contact 335 it re-connects ground to all-trunks-busy conductor 34; and at contact 332 it opens the circuit of relay 370. Therefore, this last mentioned relay also releases, whereby the circuit of the polarizing winding of relay 350 is opened at contact 375. Due to the aforementioned opening of the interoffice trunk, supervisory relay 385 restores, causing the release of relay 390 at contact 386; and at the distant end of the trunk calling bridge relay 520 of connector 500 likewise restores, causing relay 540 to release with a slight delay. At its contact 544, relay 540 opens the locking circuit of relay 580 so that this relay releases after a short delay; at its contact 543 relay 540 removes ground from control conducor 96 to permit selector 400 to release as will be described hereafter; and at its contact 542 the relay opens the locking circuit of relays 560 and 590 whereby these two relays are caused to restore and the supervisory-1 circuit accordingly is opened at contacts 566 and 594, respectively.

Relay 590, in releasing, at its contact 599*a* also closes a circuit for release magnet 91, this circuit extending from ground through contacts 522, 546, 599*a*, vertical-off-normal contact 110, release magnet 91, release battery conductor 126 and a supervisory relay, not shown, which is connected to the other end of this conductor, to battery. The operation of release magnet 91 causes the mechanism of connector switch 500 to be restored in the usual manner. Furthermore, as long as release magnet 91 is operated, its contact 93 connects ground through contacts 519 and 103 to control conductor 96 to guard the connector against seizure during the release of the switch. When the switch shaft reaches its normal position vertical-off-normal contact 100 is opened whereby the release magnet itself is caused to restore. As a result of this, ground is disconnected from control conductor 96 at contact 93 and at contact 92 ground is reconnected to the lower winding of relay 520, whereupon the switch is ready for seizure in a new call.

When relay 540, upon releasing, at its contact 543 removes ground from control conductor 96 as just described the previously traced holding circuit of switching relay 410 of selector 400, Fig. 4, was opened. Upon restoring relay 410 at its contact 416 opens another point in its locking circuit; at its contacts 411, 412 and 413, 414 it transfers conductors 77, 78 of interoffice trunk 15 from switch wipers 181, 182 back to the two windings of calling bridge relay 420; and at its contact 415 it completes a circuit for release magnet 440 which may be traced as follows: ground, contacts 415, 422, 433, vertical-off-normal contact 62, winding of release magnet 440, release signal conductor 75 and by way of this conductor through a common supervisory relay, not shown, to battery. Upon operation of release magnet 440, the switch mechanism of selector 400 is returned to normal in a well known manner. As soon as the switch shaft reaches its normal position, vertical-off-normal contact 62 opens the release magnet circuit, causing this magnet also to restore. When magnet 440 releases, it re-connects ground through contacts 443 and 452 to the lower winding of relay 420, whereby incoming selector 400 becomes ready for seizure in a new call.

Should the operator pull plug 30 before called subscriber S2 has replaced his receiver, answering bridge relay 510 is still operated at the time calling bridge relay 520 restores responsive to the withdrawal of plug 30 by the operator. Therefore, although relay 540 restores upon the opening of its circuit at contact 521, relays 560 and 590 remain locked over a circuit extending from ground through contacts 594, 566, 516 and from there through contact 568 and the upper winding of relay 560 to battery, and in parallel therewith, through contact 596 and the upper winding of relay 590 to battery. When relay 540 releases as mentioned above, direct ground is disconnected at contact 543 from back control conductor 96 to cause selector 400 to release as above described. However, when relay 540 restores the locking circuit of relay 580 is opened at contact 544 of relay 540 so that relay 580, in restoring after a short interval, at its contact 582 re-connects ground over its lower, low-resistance winding to control conductor 96 to guard the connector against seizure while the called party is still on the line. This last mentioned ground connection may be traced from ground through contacts 595, 551, 582, lower winding of relay 590, contacts 574, 534, 518, 103, to control conductor 96. Also upon release of relay 540 a supervisory circuit is closed at contact 546 of this relay which may be traced from ground through contacts 522, 546 and 599, supervisory-2 conductor 124 and a supervisory-2 lamp, not shown, which is connected to the other end of conductor 124, to battery. The lighting of the supervisory-2 lamp in this circuit serves as a warning to the officed personnel that the called subscriber has still his receiver off the hook although the calling end of the connection has already been cleared. Subsequently when called subscriber S2 also replaces his receiver, relay 510 releases, opening the above-traced locking circuits of relays 560 and 590 to cause these relays to restore. When relay 590 releases it opens the circuit of the supervisory-2 lamp at its contact 599; at its contact 595 it disconnects low-resistance guarding ground from conductor 96; and at its contact 599*a* it completes the previously traced circuit for release magnet 91. This causes the switch mechanism to be restored and, accordingly, vertical-off-normal contact 110 to be opened so that magnet 91 also releases. With contact 93 of release magnet 91 reopened and contact 92 of this magnet re-closed, the connector is ready for seizure in a new call.

Having thus described the setting up of a call from the operator in office A to subscriber S2 in office B if the line of this subscriber is idle it will now be assumed that this subscriber's line is busy at the time the wipers of connector 500 are positioned into engagement with the set of contacts terminating this line in the connector bank. Under this condition ground potential is connected to the test contact of this contact set to guard this line against seizure so that during the busy test interval referred to above the following circuit is completed for busy relay 570, Fig. 5: ground on the afore-mentioned test contact, test wiper 123, contacts 551, 584, 544, and 598, winding of busy relay 570, battery. At contact 574 the busy relay, upon operating, opens a point in the operating circuit of switching relay 590, at its contact 575 relay 570 prepares its own locking circuit, this circuit being completed at contact 583 when relay 580 subsequently releases to terminate the busy test interval, at contact 571, 572, relay 570 transfers the lower winding of calling bridge relay 520 from ground at contact 92 to busy flash conductor 84 by way of resistor 111; and at contact 573 the busy relay connects the upper or holding winding of release-delay-relay 540 to busy hold conductor 85 over the following path: ground, contact

542 of relay 540, contact 573, upper winding of relay 540, busy hold conductor 85.

Busy flash conductor 84 and busy hold conductor 85 terminate in common tone and interrupter equipment 161, this equipment being schematically indicated in Fig. 5. As shown in this figure, busy flash conductor 84 terminates in an interrupter contact of the break-make type of which one side, designated by numeral 86, is connected through the secondary winding of busy tone coil 90 to ground while the other side 87 is connected to battery. Busy hold conductor 85 terminates in an interrupter contact 89 of the make type, the make spring of this contact being connected to battery. As indicated in Fig. 5, both these interrupter contacts are mechanically connected with each other and therefore actuated in unison, the arrangement being such that contacts 87 and 89 are connected to battery at the same time. The interrupter may be of any suitable type, for instance, of the type in which a shaft continuously driven, for example, by an electric motor actuates the interrupter contacts by way of cams mounted on that shaft. The rate of interruption of interrupter 161 in office B as well as that of interrupter 57 in office A is chosen such that a clearly discernible lamp flashing signal may be produced thereby. Assuming this rate of interruption to be, for example, of the order of 40 I. P. M., contact 86 and contacts 87, 89 are alternately closed for approximately 750 milliseconds each.

It will be noted that in this fashion the normally ground-connected winding of relay 520 is periodically transferred by means of interrupter contacts 86, 87 from busy-tone-superimposed ground to battery and back. During each closure of interrupter contact 86, busy tone is thus returned through the lower winding of relay 520 to the calling side of the connection. On the other hand each time the lower winding of relay 520 is connected to battery through contact 87, the loop circuit extending back over the calling side of connector 500 is deenergized as both windings of relay 520 are then connected to battery and relay 520 is caused to release, thereby opening the circuit to release delay relay 540. It will be noted that in this manner relay 520, in view of the above mentioned interrupter rate, is released each time for roughly 750 milliseconds, that is for a time interval greater than the release time of a slow-to-release relay such as relay 540, this release time being of the order of say, 300 milliseconds. As a result unless special precautions were taken, relay 540 would restore shortly after the first release of relay 520 and thereby cause the connector to release so that the proper transmission even of the initial flashing signal element over conductors 94, 95 would be obviated. Such premature release of relay 540 is avoided in the present arrangement due to the fact that simultaneously with the connection of battery at interrupter contact 87 to the lower winding of relay 520, battery is connected through interrupter contact 89 to the upper winding of release delay relay 540, whereby relay 540 during this busy flash interval is held independently of calling bridge relay 520 in the following local circuit: ground, contacts 542 and 573, upper winding of relay 540, busy hold conductor 85, interrupter contact 89, battery.

When interrupter contact 87 applies battery to the lower winding of relay 520 for the first time, whereby the loop extending back over conductors 94, 95 in connector 500, wipers 81, 82 and switching contacts 412, 414 of incoming selector 400 and conductors 77, 78 of interoffice trunk 15 is deenergized, supervisory relay 385, Fig. 3, at the calling end of this loop releases, opening at its contact 386 the circuit of slow-to-release relay 390. This last mentioned relay, in restoring after a certain delay, at its contact 393 opens the last mentioned loop circuit so that relay 385 remains in released condition irrespective of any circuit functions at the connector end of the loop. With the loop circuit thus permanently opened, calling bridge relay 510 in connector 500, therefore, is likewise prevented from re-operating or remaining operated when ground is reapplied to its lower winding at contact 86 of interrupter 161. With relay 520 permanently released the lower winding of release delay relay 540 of connector 500 is permanently deenergized with the result that this relay restores after a slight delay, provided that—or as soon as—battery is disconnected from its holding winding at interrupter contact 89. At contacts 543 and 544 relay 540 in releasing opens the above-traced holding circuit of relay 570; at contact 543 relay 540 also removes ground from control conductor 96 so that selector 400 is permitted to release as above described; and at contact 546 the relay completes the previously traced circuit for release magnet 91 to cause the switch mechanism of connector 500 to restore to normal. During the time that release magnet 91 is operated the connector is guarded against seizure due to the actuation of contacts 92, 93, of this magnet as heretofore described. As soon as the switch shaft reaches its normal position the circuit of release magnet 91 is opened at vertical-off-normal contact 110 so that the release magnet is deenergized and the switch thereby rendered available for seizure in another call.

Referring now to the operations taking place in repeater 300 when relay 390 in this repeater releases responsive to the restoration of supervisory relay 385, relay 390 at its contacts 392, 391 transfers the upper, normally ground connected winding of calling bridge relay 340 from direct ground to busy flash conductor 44 by way of resistor 39; and connects the upper winding of relay 380 to busy hold conductor 41.

Busy flash conductor 44 and busy hold conductor 41 terminate at their other ends in common tone and interrupter equipment 57 of office A, this equipment being similar to the tone and interrupter equipment 161 common to office B. Thus interrupter 57 functions to periodically connect busy flash conductor 44 to battery at contact 54 and simultaneously therewith connects busy hold conductor 41 to battery at contact 55. Between these intervals busy flash conductor 44 is connected by way of contact 53 to the secondary winding of busy tone coil 56, the other end of this winding being connected to ground. As mentioned above, it is assumed that interrupter 57 operates at a rate of approximately 40 I. P. M., that is contact 53 and contacts 54, 55 are alternately closed for approximately 750 milliseconds each.

While contact 53 is closed busy tone is connected from the grounded secondary winding of busy tone coil 56 through interrupter contact 53, busy flash conductor 44, resistor 39, contacts 391 and 373, upper winding of relay 340 and contact 315 to positive talking conductor 32 of local trunk 14, first selector 11, Fig. 1 and the ring side of switchboard jack and plug to the operator's handset, not shown, in Fig. 2, provided the listening key, also not shown, is thrown in cord circuit 200; the return path of this busy tone circuit similarly extending over the negative side of the connection to the lower winding of relay 340 and battery. If the distant calling subscriber is connected through by way of repeat coil 1 and the answering side, not shown, of cord circuit 200, Fig. 2, at the time, the busy tone will in a similar manner be transmitted all the way to the receiver at this calling subscriber's station.

During each flash interval of interrupter 57, that is each time battery is connected to the upper winding of relay 340 through interrupter contact 54, busy flash conductor 44, resistor 39 and contacts 391 and 373, the loop circuit extending back over conductors 31, 32 is deenergized due to both legs of this loop being connected to battery. Consequently, supervisory relay 210, Fig. 2 at the calling end of this loop releases periodically to open the circuit of supervisory lamp 24, whereby this lamp is flashed at the periodicity of interrupter 57, that is approximately 40 I. P. M. A rate of this general order has been found to produce a satisfactory lamp flashing signal for visually advising the operator of the existence of a busy condition.

As relay 340 in repeater 300 is also included in the supervisory loop extending back to cord circuit 200, this relay likewise restores each time interrupter contact 54 connects battery to the upper winding of this relay. At its contact 343 relay 340 in releasing opens the original operating circuit of relay 330; and at its contact 344 the relay closes a point in a circuit extending through the upper winding of relay 380, another point in this circuit being closed at interrupter contact 55 during each flash interval. This circuit through the upper winding of relay 380 may be traced as follows: ground, contacts 344, 395, 331, upper winding of relay 380, busy hold conductor 41, interrupter contact 55, battery.

Each time that relay 380 operates in this circuit it closes at its contact 381 an alternative circuit for release delay relay 330, this circuit extending from ground through contacts 363 and 381 and the winding of relay 330 to battery. It will be noted, therefore, that relay 380, by virtue of its operation during each flash interval, insures the holding of release delay relay 330 throughout the transmission of busy flash and tone. Such local holding is provided in view of the fact that, assuming a flashing rate of 40 I. P. M., the approximate 750 milliseconds interval during which line relay 540 is restored, is longer than the release time of relay 330, this release time being roughly of the order of 300 milliseconds. It should, however, be understood that the foregoing time values are given by way of example only and that other interrupter rates and release times may be used if desired. Furthermore, while in the arrangement described herein the local holding means which are made effective during the flash inteveral act directly on the release delay relay, such local holding may also be accomplished in other ways such as by connecting the busy hold conductor 41 to a holding winding on the line relay itself.

When the operator upon noticing the busy signal withdraws plug 30 to release the connection, line relay 340 releases if the plug is pulled at a time interrupter 53 is closed or is prevented from re-operating if the plug is pulled at a time interrupter contact 54 is closed. With contact 343 thus remaining opened relay 330 releases with a slight delay if or as soon as relay 380 is restored depending on the condition of interrupter contact 55 at that time. At its contact 331 relay 330, upon releasing, opens another point in the circuit of relay 380 to keep this relay from re-operating; at its contact 332 it opens the circuit of slow-to-release relay 370 which relay, upon restoring, at contact 375 opens the circuit of the polarizing winding of relay 350; at its contact 335, relay 330 re-closes ground to all-trunks-busy conductor 34; and at its contact 334 it removes ground from back control conductor 33 to bring about the release of first selector 11, Fig. 1. At this point all the equipment involved in the setting up of the connection by the operator has returned to its normal condition.

It will be appreciated from the foregoing description that inasmuch as trunk 15 and the automatic equipment in office B is already released at the time the operator withdraws plug 30 from the switchboard jack responsive to the receipt of the busy signal, there is no danger of repeater 300 then being re-seized in another call while connector 500 is still being held under the control of busy hold conductor 85. The feature of the present invention that the aforementioned automatic equipment is released after the busy signalling functions has been transferred to apparatus further back in the connection without awaiting a disconnect operation on the part of the operator, also has the advantage that at least a part of this automatic equipment, in the instant case connector 500, is rendered available at the earliest possible moment for use in connection with other calls.

It will be further understood that since connector 500 is equipped with the busy flash and busy hold features described above, this connector is universally operable in connection with switchboards of the flash busy type and may, more particularly, be used with outgoing repeaters which do not incorporate the trunk release feature of repeater 300, Fig. 3. It should also be mentioned at this point that while the invention has been illustrated herein in connection with a switchboard of the bridge control type in which the supervisory lamps are directly controlled by relays in the cord circuits, the invention is also applicable, for example, to switchboards of the well-known sleeve control type, wherein the supervisory relays are associated with the switchboard jack and the supervisory lamps in the cord circuits are controlled over sleeve circuits extending over the jacks and plugs.

In the foregoing description it was assumed that when incoming selector 400 automatically rotated its wipers over the bank contacts of the selected level in search for an idle connector 500 such an idle connector was found and the rotation of the switch shaft arrested on the bank contacts associated with that connector. Assuming now that all connectors accessible over the selector level are busy at the time selector 400 performs its hunting operation so that switching relay 410 cannot operate due to ground being encountered by test wiper 83 on each control conductor such as 96 tested, then the interaction between rotary magnet 480 and relay 460 and, therefore, the rotary stepping action of the selector will continue until the switch reaches its eleventh rotary position. In this position cam or overflow springs of the switch are actuated by a cam mounted on the switch shaft in the well known manner.

At cam contact 68 a point is opened in the circuit extending from ground at contact 431 through cam contact 68, winding of relay 410, contact 481 of rotary magnet 480, vertical-off-normal contact 63, through the winding of relay 460 to battery, so that relay 460 cannot re-operate when magnet 480 re-closes its contact 481 in the eleventh rotary position of the switch. At cam contact 69 a circuit is again closed through the lower winding of transfer relay 450. This circuit may be traced from ground at contact 431, through cam contact 69, contact 434, lower winding of relay 450, supervisory battery conductor 76, common supervisory relay, not shown, at the other end of this conductor, to battery. At cam contact 71 a point is closed in a circuit extending from ground at cam contact 71 through the lower winding of relay 430, busy hold conductor 85, interrupter contact 89 in common interrupter 161, to battery.

In each selector level the positive bank contacts in the eleventh rotary position of each selector of the group are multiplied together and connected through a conductor such as 166 to an overflow meter such as 167, Fig. 4. Each of these meters thus serves to register the number of times a selector in the group reaches the eleventh rotary step, upon all outlets in the level having been found busy in an attempt to extend a call over the level with which the meter is associated.

When relay 450 operates upon re-energization of its lower winding, contact 453 of this relay completes the following circuit for overflow meter 167 associated with the selected level: ground, contacts 431, 69, 453, positive switch wiper 82, and positive bank contact engaged thereby in the eleventh rotary position of the switch, conductor 166, overflow meter 167, battery. Meter 167 is actuated in this circuit.

Relay 450, upon operating, at its make-before-break contacts 451, 452 also transfers the lower winding of line relay 420 from direct ground through contact 443 to busy flash conductor 84 through rotary-off-normal contact 66 and resistor 67. Due to the switching action of contacts 86, 87 of common interrupter 161, the function of which was described above in connection with the operation of connector 500, the lower winding of line relay 420 will thus be periodically switched from busy-tone-superimposed ground to battery at a rate of approximately 40 I. P. M. When battery is connected to the lower winding of relay 420, both relay 385 in outgoing repeater 300 and relay 420 in selector 400 are deenergized for approximately 750 milliseconds. The release of relay 385, at contact 386 of this relay causes relay 390 to release as above described in connection with a line busy condition in connector 500. Upon the release of relay 390, contact 391 connects the upper winding of relay 340 to the local busy flash conductor 44, whereby supervisory relay 210 in cord circuit 200 is intermittently caused to release and supervisory lamp 24 to be extinguished; and contact 393 permanently opens the loop extending over trunk conductor 77, 78 so that both supervisory relay 385 in repeater 300 and line relay 420 in selector 400 remain in restored condition. As a result relay 430 in this selector will release with a slight delay if or when its lower winding which is connected to busy hold conductor 85 is deenergized. When relay 430 releases it opens at its contact 431 the circuit of overflow meter 167 so that this meter is restored to normal; at this same contact and also at its contact 434 relay 430 causes the release of relay 450; and at its contact 433 relay 430 completes a previously traced circuit for release magnet 440. Upon operation of release magnet 440 the selector switch mechanism is restored to normal and the magnet itself is caused to release as soon as vertical-off-normal contact 62 interrupts its circuit. With contact 443 of release magnet 440 re-closed, incoming selector 400 is ready for seizure in a new call over interoffice trunk 15.

It will be clear from the foregoing description that when an overflow condition is encountered in selector 400, outgoing repeater 300 is caused to release the incoming selector switch and return busy tone as well as a flashing signal from a local source, namely the common interrupter 57 in office A. Consequently, no difficulties due to the busy hold feature of selector 400 are encountered in the release of the connection when the operator upon noticing the busy signal withdraws the plug as described above.

When the operation of repeater 300 on seizure was described above it was assumed that there was no interruption in trunk 77, 78. Therefore, when relay 370 in operating, at contact 378 opened the operating circuit of relay 390 and at contact 372 completed the loop circuit, supervisory relay 385, upon operating over this circuit, at its contact 386 closed an alternative circuit for slow-to-release relay 390 in time for this relay to remain operated. On the other hand, let it now be assumed that because of some unstandard condition the loop circuit for supervisory relay 385 cannot be completed. Among such unstandard conditions are a disconnection in trunk conductor 77, 78; a short circuit or low-resistance leak between these conductors depriving relay 385 of the sufficient current for operating; or removal of incoming selector switch 400 from its base in which case battery and ground feed are not available for the afore-mentioned loop circuit. In each of these cases failure of supervisory relay 385 to operate subsequent to the operation of relay 370 results in the restoration of relay 390 after a slight delay. The consequences of the release of the relay 390 under this condition are the same as those described above in connection with a called line busy or overflow condition; that is, at contact 393 a point in the loop circuit is opened to keep supervisory relay 385 in restored condition and at contact 391 the upper winding of relay 340 is connected to busy flash conductor 44 while contact 394 closes a point in the circuit for relay 380. In this way busy tone and busy flash are returned to the calling side after completion of the first digit of the called subscriber's number, as an indication to the operator or the calling subscriber that the attempted call cannot be extended to office B.

It will be seen from Fig. 3, that the lower winding of relay 380 is normally connected by way of contact 371 of relay 370 to the negative conductor 77 of interoffice trunk 15; and in Fig. 4, there is provided a busy key 72 which, upon actuation, at its make contact 74 applies ground to the other end of the negative conductor 77. This "busy-back" arrangement serves to render outgoing repeater 300 busy in the first selector banks in office A when interoffice trunk 15 and incoming selector 400 for some reason, for instance because of repairs, are to be taken out of service.

More particularly, when busy key 72, Fig. 4, is thrown, battery feed through the upper winding of relay 420 and contact 411 is disconnected from the interoffice trunk at contact 73; and connection of ground to negative trunk conductor 77 at contact 74 causes relay 380, Fig. 3, to operate by way of this conductor and contact 371, through its lower winding. Relay 380, upon operating, at its contact 383 opens the all-trunk-busy conductor to facilitate all-trunks-busy metering in a well known manner; and at its contact 382 the relay connects ground through contact 353 of relay 350 and contact 37 of busy key 35 to control conductor 33 to make repeater 300 busy in the banks of first selectors 11 and 13 and thereby prevent seizure of the repeater. Contact 382 also closes an obvious circuit to the polarizing winding of relay 350 but the energization of this winding is of no consequence at this time.

If repeater 300 is to be busied locally rather than by means of busy key 72 at the distant end, busy key 38 in Fig. 3 may be thrown so that ground is applied to control conductor 33 at contact 36 to guard the repeater against seizure and ground is disconnected from the all-trunks-busy conductor at contact 38 to provide for all-trunks-busy metering.

*Call from substation S1 in office A to substation S2 in office B*

It will next be assumed that a call to a subscriber such as S2 in office B instead of being placed by or through an operator at switchboard 10, originates at an automatic substation, for example S1, in office A, Fig. 1. Such a connection is set up in a manner very similar to that described above except that when subscriber S1 lifts his receiver from the switchhook, a line finder such as line-finder 12 is caused to search for the calling line under the control of allotter 17. After the calling line has been found, the calling subscriber S1 upon receiving dial tone from local first selector 13 in a well known manner dials the first digit of the called subscriber's number by correspondingly actuating the dial at his station. In response to this digit the wipers of first selector 13 are raised to the level in which the local trunks associated with repeaters terminating the interoffice trunks to office B are connected, whereupon the selector 13 automatically rotates its wipers in search for the first idle trunk in this level. Assuming that local trunk 14 associated with repeater 300 is the one seized, a loop circuit is closed upon switchthrough of local first selector 13 which extends from the closed switchhook contacts at substation S1, Fig. 1, the two talking conductors of subscriber's line 9, line circuit 18, linefinder 12, local first selector 13, conductors 32 and 31 of local trunk 14, Fig. 3, contacts 315 and 313 of relay 310 and the upper and lower windings of relay 340, and from there to ground and battery, respectively.

From this point on the operations taking place in the setting up of a connection to subscriber S2 via incoming second selector 400, connector 500, line circuit 19, and the calling subscriber's line 16, are the same as described above in connection with a call from switchboard 10 except that the dial impulses of the remaining digits which are repeated by delay 340, Fig. 3 originate in this case in the dial of automatic substation S1.

Assuming that the called subscriber's line has been found idle and that ringing current has accordingly been projected over this line 16, the answering of the call at substation S2 results in the operation of relays 560 and 510 in connector 500, Fig. 5, and the sequential operation of polarized relay 350 and reversal relay 310 and restoration of slow-to-release relay 360 in repeater 300, Fig. 3. As the call is assumed to have originated at an ordinary subscriber's station in office A, the polarity reversal at contacts 312, 313 and 314, 315 of reversal relay 310 is without effect in the instant case. On the other hand, when due to the interaction of relays 350 and 310 booster battery is applied to control conductor 33 in two steps as above explained, the booster battery circuit in the present case extends over conductor 33 through the winding of switching relay 171 of first selector 13 to battery, in multiple therewith through the winding of switching relay 172 of line-finder 12 to battery, in multiple therewith through the winding of line cut-off relay 173 of line circuit 18 to battery, and also in multiple therewith through resistor 175 and the winding of message register or meter 174 to battery.

Meter 174 which is individually associated with line circuit 18 and serves to register the number of completed calls originated at substation S1 is so designed and adjusted and the resistance value of resistor 175 is so chosen that the meter will not operate when the control conductor is connected to ground during the time the preceding equipment is held over this conductor from ground applied in repeater 300. As the left-hand terminal of the winding of meter 174 is connected to the exchange battery and assuming that this exchange battery has a voltage of about 50 volts, only approximately 50 volts appear across the series connection of resistor 175 and meter 174 under this condition. However, when ground on conductor 33 is replaced by 50-volt booster battery in repeater 300 as explained above, the voltage across the meter and its resistance is momentarily raised to roughly 100 volts, the booster battery due to its polarity in the metering circuit being in series aiding connection with the exchange battery. Meter 174 operates on this high voltage and relays 171, 172, 173 hold. When, at the end of the metering impulse, control conductor 33 is switched from booster battery back to ground as above described meter 174 remains operated on the reduced voltage; and the meter and relays 171, 172 and 173 will not release until holding ground is finally disconnected from control conductor 33 in repeater 300 when the calling party at the end of the conversation releases the connection.

It will be understood from the foregoing description that a heavy current drain on the booster battery which would otherwise result in view of the high voltage of the booster battery circuit and the multitude of current consuming apparatus connected to the control conductor, is avoided by applying the booster battery to the control conductor only for an interval sufficient to actuate the meter. It is also because of the afore-mentioned characteristics of the booster battery circuit that the two-step switching of the circuit is of considerable benefit in protecting the switching contacts involved.

It was assumed above that the line of called subscriber S2 was found idle in the banks of connector 500. If this line is busy or if the wipers of selector 400 are automatically rotated into the overflow position because all connectors in the selected group are busy, then the aforementioned equipment at office B functions to return busy tone and flash busy over the interoffice trunk exactly as explained in connection with the call from switchboard 10. Repeater 300 at the outgoing end of this trunk is triggered by the receipt of this flash busy signal to release the automatic switching equipment in office B and return busy tone and flash busy under the control of local interrupter 57 in office A. As in the instant case the call originated at automatic substation S1 the transmission of flash busy from repeater 300 is without effect, but the busy tone transmitted from this repeater under the afore-mentioned condition and also in the case of a defective interoffice trunk is received in the calling subscriber's instrument and induces this subscriber to replace his receiver. As a result the automatic equipment in office A restores to normal as above described.

*Call from substation S3 in office B to substation S2 in office B*

Referring again to Fig. 1, it will be evident that a call from substation S3 in office B to substation S2 in the same office is extended by way of subscriber's line 189, line circuit 188, linefinder 182, local first selector 183, local second selector 185, connector 500, line circuit 19, and subscriber line 16. Assuming that the line of the called subscriber has been found idle and that ringing current has accordingly been transmitted over this line, the called party at substation S2 will answer the call by lifting his receiver. As a result of this, ring cut-off relay 560 in connector 500 operates to trip the ring and switch the called line through to answering bridge relay 510 which also operates. Due to the operation of this last mentioned relay the direction of current flow over the calling loop extending over line 189 of calling station S3 is reversed but, assuming that this substation is an ordinary subscriber's station this polarity reversal will be without effect. In addition upon operation of relay 530 under the control of relay 510, booster battery is connected to back control conductor 96 in two steps, and when relay 530 restores shortly thereafter under the control of relay 580, booster battery is again disconnected from that conductor in two steps, as explained hereinbefore in connection with a call from switchboard 10.

Since in the present instance the call originated at the automatic subscriber's station S3 in office B, it will be clear without further elaboration that the following apparatus is connected to control conductor 96 in the equipment preceding connector 500: the switching relay of local second selector 185 and in parallel thereto the switching relay of local first selector 183, these switching relays corresponding to relay 171 schematically shown in Fig. 3; also in parallel thereto the switching relay of linefinder 182 which corresponds to relay 173, Fig. 3; the line cut-off relay of line circuit 188 which corresponds to relay 173, Fig. 3; and the calling subscriber's meter and its associated series resistor, this meter and resistor respectively corresponding to meter 174 and resistor 175 shown in Fig. 3. Therefore, when booster battery is substituted for direct ground on control conductor 96 in connector 300, the subscriber's meter is operated and the afore-mentioned switching relays are held; and the meter together with the switching relays will remain operated when at the end of the booster battery pulse ground is again substituted for booster battery, and will not release until ground is removed from the control conductor upon termination of the call by the calling party. It will again be noted that since the booster battery is applied for only a short interval a heavy drain on the booster battery is obviated and that the connection and disconnection of this battery in two steps of current each avoids damage to the switching contact in spite of the substantial current flowing through the booster battery circuit.

If it is assumed that connector 500 tests busy when its wipers are brought into engagement with the set of contacts giving access to subscriber's line 16, the connector acts to return flash busy and busy tone as above described. The transmission of flash busy is without consequence in this type of call but the busy tone is received in the calling party's instrument and induces the subscriber to replace his receiver.

*Call from switchboard 10 in office C to substation S4 in office D*

If the operator at switchboard 10 in office C, Fig. 6, wishes to set up a call to subscriber S4 in office D she inserts calling plug 30 of her cord circuit 200, Fig. 2, into switchboard jack 141 of outgoing repeater 700, Fig. 7, after ascertaining by means of a click test or by observing busy lamp 148 that this repeater is idle. This insertion of plug 30 closes the following loop circuit: ground, contact 722, Fig. 7, lower left-hand winding of repeat coil 142, contact 744, ring of jack 141, Fig. 7, ring of plug 30, Fig. 2, contact 234, lower right-hand winding of repeat coil 1, Fig. 2, lower winding of polarized relay 220, winding of supervisory relay 210, upper right-hand winding of repeat coil 1, contact 232, tip of plug 30, Fig. 2, and of jack 141, Fig. 7, contact 742, upper left-hand winding of repeat coil 142, upper winding of relay 730, battery. Supervisory relay 210 which operates in this circuit, at its contact 211 closes an obvious circuit to supervisory lamp 24 which accordingly is lit; and at its contact 212 closes a circuit through the polarizing winding of relay 220. This relay, however, does not operate at this time as its two windings are energized in an opposing sense. Line relay 730 in repeater 700 also operates in the afore-mentioned loop circuit, preparing at its contact 733 a circuit extending over Signal Out conductor 147 and closing at its contact 731 the circuit of slow-to-operate relay 720. Relay 720 upon operating after a slight delay at its contact 721 disconnects the line termination 145 which, in a manner well known in the art, is normally connected across the talking conductors for balancing purposes; at its contact 722 it opens the short circuit across the lower winding of line relay 730, this winding being normally short-circuited over contact 722 to prevent this relay from responding to preliminary impulses; at its contact 723, relay 720 connects ground to start conductor 149, this conductor being required only if the terminal equipment is operated on a start and stop basis; at its contact 724 it closes a point in the circuit of slow-to-release relay 750; at contact 725 it connects Signal In conductor 146 to the winding of relay 740; at contact 726, relay 720 closes a sleeve guarding circuit extending from ground at contact 726 through the winding of relay 710, sleeve of switchboard jack 141, sleeve of plug 30, Fig. 2, and resistor 29 to battery; and at contact 727 it connects ground to busy lamp 148, one such lamp being provided for every appearance of repeater 700 in the switchboard multiple. Relay 710 on operating in the circuit just traced, at its contact 711 connects a multiple ground to the winding of relay 720 to prevent the release of this relay until the operator takes down the connection; and at its contact 712 completes the following circuit to Signal Out relay 760 in carrier terminal 21: ground, Signal Out relay 760, Signal Out conductor 147, contact 712, contact 733, resistor 144, battery.

Signal Out relay 760 upon operating causes the carrier equipment in terminal 21 to steadily apply to line 194, 195 the carrier frequency, hereafter referred to as west-to-east carrier frequency, which is used for the transmission of control signals from office C to office D. Regarding details of operation of the carrier equipment at both ends, reference is made to Molnar Patent 2,599,165; but it should be noted here that when the carrier equipment is actuated by means of Signal Out relay 760, the carrier signal transmitted by terminal 21 is applied to line 194, 195 through a signal transmitting filter which passes the west-to-east carrier frequency itself to the exclusion of the side-band used for the transmission of audio frequencies. At the other end the control signal carrier frequency passes a similar signal receiving filter provided thereat, and after the necessary amplification and rectification brings about the release of a Signal In relay 810 in termination 23, Fig. 8, as more fully explained in the aforementioned patent. Signal In relay 810, in restoring, at its contact 811 closes the circuit extending over Signal In conductor 156 and the winding of relay 850 to battery. When relay 850 operates in this circuit it prepares at its contact 851 a loop circuit extending over conductor 77, 78, to line relay 420 of incoming selector 400, Fig. 4. Conductors 77, 78 could well be the talking conductors of a two-wire interoffice trunk such as interoffice trunk 15 in Fig. 1, but in the present case it has been assumed in accordance with Fig. 6, that conductors 77, 78 belong to a two-wire local trunk 158 interconnecting incoming repeater 800 and incoming selector 400 in office D. At its contact 852, relay 850 causes the operation of relay 860. This last-mentioned relay, upon operating, at its contact 861 closes an obvious circuit through the polarizing winding of relay 840; at its contact 862, relay 860 completes the afore-mentioned loop circuit over trunk 158 which circuit may be traced from ground, contacts 443, 442 in selector 400, Fig. 4, lower winding of relay 420, contact 413, positive talking conductor 78 of trunk 158, contacts 862, 851, Fig. 8, lower right-hand winding of repeat coil 151, upper winding of relay 840, winding of relay 830, upper right-hand winding of repeat coil 151, negative talking conductor 77 of trunk 158, contacts 73 and 411, Fig. 4, upper winding of relay 420, battery; at its contact 863, relay 860 closes a point in the circuit of Signal Out relay 820; and at contact 864 it prepares a circuit through slow-to-release relay 870. Supervisory relay 830 operates in the loop circuit traced above; at its contact 832 it opens a point in the circuit of Signal Out relay 820 to keep this relay from operating at this time; and at contact 831, relay 830 prepares an alternative circuit for relay 820. Polarized relay 840 does not operate at this time as its two windings set up opposing fields.

At the selector end of the last mentioned loop circuit line relay 420 operates, causing the operation of relay 430 which in turn causes relay 450 to operate. Incoming selector 400 is seized thereby in a manner described in detail hereinbefore.

The operator now actuates her dial key so that relay 230 at its contacts 231, 232 and 233, 234 transfers the loop circuit from the secondary winding of repeat coil 21 to dial 27 in the operator's cord circuit and supervisory lamp 24 is extinguished upon the release of supervisory relay 210. The operator then manipulates dial 27 in accordance with the first digit of the called subscriber's number so that dial impulse springs 27*a* open the calling loop a number of times corresponding to this digit. Line relay 730, Fig. 7, in restoring on each of these digital impulses, at its contact 732 completes a circuit through contacts 724 and 746 to the winding of slow-to-release relay 750 which operates in this circuit. This relay which due to its slow-to-release characteristic remains operated throughout the impulse series, at contact 752 connects multiple ground to busy lamps 148 and at contact 751 shortcircuits the lower left-hand winding of repeat coil 142 to improve impulsing over the last mentioned loop circuit. Each time line relay 730 operates it also opens at its contact 733 the circuti of Signal Out relay 760 which on each release interrupts the transmission of the control signal carrier frequency over the link 22. At the other end of this link, Signal In relay 810, Fig. 8, reoperates in response to each of these interruptions, opening at its contact 811 the circuit of relay 850 in incoming repeater 800. Relay 850 in restoring on each impulse, at its contact 852 opens the circuit of relay 860, but this relay, by virtue of its slow-to-release characteristic fails to release on these impulses; and at its contact 853 completes the circuit of relay 870 which, being likewise of the slow releasing type remains operated throughout each impulse series. Relay 870 improves impulsing conditions by removing at its contact 871 line termination 159 from across the talking conductors and by closing at its contact 872 a shunt path including resistor 153 across the winding of relay 830, the line winding of relay 840 and the lower right-hand winding of repeat coil 151. Each time relay 850 releases it also opens the loop extending over trunk 158 at contact 851 so that, in the end, line relay 420 of incoming selector 700 restores in response to each opening of impulse springs 27*a* of the operator's dial.

Responsive to each restoration of line relay 420 the wipers of selector 400 are elevated one step so that at the end of the impulse series these wipers have been raised to the desired level as explained hereinbefore in connection with the description of a call from switchboard 10 to substation S2, Fig. 1. The wipers of selector 400 are then automatically rotated over the contacts in this level in search for an idle one of the connectors accessible over this level and if an idle connector, for instance, connector 500, Fig. 5, has been found are arrested on the set of contacts corresponding to this connector. After switching relay 410, Fig. 4, operates as described hereinbefore, the loop circuit including relays 830 and 840, Fig. 8, is extended at contacts 412, 414 of relay 410 to calling bridge relay 510 of connector 500 so that this last mentioned relay operates.

The operator now dials the second and third digits of the called party's number and in response thereto relay 850 in incoming repeater 800, Fig. 8, and under the control thereof, relay 520 in connector 500, Fig. 5, are caused to restore a number of times corresponding to the number of impulses in each of these two digits, the impulses transmitted by dialing impulse springs 27*a*, Fig. 2, being repeated over link 22 in the same manner as explained above for the first digit. As a result the wipers of connector 500 are first raised to the level containing the set of contacts over which subscriber's line 24 is accessible and are then rotated into engagement with these contacts.

Assuming that line 24 of subscriber S4 is idle, switching relay 590 of connector 500 operates and locks and ringing current is automatically projected over the called line from generator and battery conductor 99 while ring-back tone is returned to the calling end of the connection from ring-back tone conductor 127, all as previously explained. In incoming repeater 800, the ring-back tone is transmitted over repeat coil 151 to carrier terminal 23 where it is impressed by the modulation equipment in this terminal on the carrier frequency used for the transmission of intelligence from office D to office C, this frequency being hereafter referred to as the east-to-west carrier frequency. It should be noted that the modulated carrier is passed in this terminal through a transmitting band pass filter which insures that only the lower side band of the east-to-west carrier is transmitted over line 194, 195 at this time, to the exclusion particularly of the east-to-west carrier frequency itself, this last mentioned carrier frequency being used for the transmission of the supervisory signals as described hereafter. In carrier terminal 21 at the other end the modulation products are passed through a receiving band pass filter and the ring-back tone is then separated from the carrier by means of de-modulation equipment provided in carrier terminal 21, to be finely impressed by way of repeat coil 142, Fig. 7, on the tip and ring conductors leading to the operator's circuit, Fig. 2. The receipt of this tone in the operator's earphones indicates to the operator that the called party is being rung.

When the subscriber at substation S4 answers the call by lifting his receiver, closure of the loop over the subscriber's line causes the operation of ring cut-off relay 560 and answering bridge relay 510, Fig. 5, as heretofore described, with the result that polarized relay 840 operates due to the direction of the current through the line winding of this relay being reversed at contacts 511, 512 and 513, 514 of relay 510. Upon operation of relay 840 a circuit is closed for Signal Out relay 820 which extends from ground through the winding of this Signal Out relay, Signal Out conductor 157, contacts 863, 831, and 842, resistor 154 to battery. Relay 820 in operating causes the equipment in carrier terminal 23 to apply the east-to-west carrier frequency through a signal transmitting filter to line 194, 195, this signal transmitting filter serving to substantially reject all frequencies except that of the east-to-west carrier itself. At the other end the east-to-west carrier frequency is first passed through a signal receiving filter and after the proper amplification and rectification is used to cause the release of Signal In relay 770 as explained in more detail in Patent 2,559,165. Relay 770 upon restoring, at its contact 771 closes a circuit for relay 740, this circuit extending from ground through contact 770, Signal In conductor 146, contact 725, winding of relay 740 to battery. Relay 740, upon operating, at its contact 745 connects a multiple ground to the winding of relay 720 to hold this relay operated; at its contact 747 connects a multiple resistance battery to Signal Out conductor 147 to maintain Signal Out relay 760 in operated condition; and at its contacts 741, 742 and 743, 744, reverses the flow of current over the calling loop. In consequence thereof polarized relay 220 in cord circuit 200, Fig. 2, operates, opening at its contact 221 the circuit of supervisory lamp 24. The darkening of the supervisory lamp informs the operator that the call has been answered. The operation of answering bridge relay 510, Fig. 5, also causes booster battery to be applied to back control conductor 96 as described above. However, since no message register is connected to this conductor in this type of call, this application of booster battery is without effect in the instant case.

The apparatus is now in such a condition that the conversation between the operator in office C, or a distant calling subscriber switched through by way of cord circuit 200, on the one hand and the called subscriber S4 in office D on the other hand may proceed. Attention is called to the fact that in this condition the following frequencies are transmitted over carrier link 22: (1) the west-to-east carrier frequency, this frequency serving to hold the equipment in office D operated; (2) the lower side band of the west-to-east carrier frequency, this band comprising the modulation products which are due to the modulation of this carrier by speech transmitted in the direction from office C to office D; (3) the east-to-west carrier frequency proper, this supervisory signal frequency serving to maintain the operator's supervisory lamp in extinguished condition as long as the called party has his receiver off the hook; and (4) the lower side band of the east-to-west carrier frequency, which band contains the modulation products due to the modulation of this carrier by the speech transmitted in the direction from office D to office C.

When the called party at the end of the conversation replaces his receiver, relay 510 of connector 500, upon restoring, at its contacts 511, 512, and 513, 514 reverses the direction of the current on the calling side of this connector so that relay 840 in incoming repeater 800 releases, in turn causing the release of Signal Out relay 820. Due to the release of this Signal Out relay the transmission of the supervisory signal carrier frequency is discontinued by the carrier equipment in terminal 23, and as a result, Signal In relay 770 in terminal 21 at the other end re-operates to open, at its contact 771, the circuit of relay 740. This last mentioned relay, upon restoring at its contact 745 removes a multiple ground from the winding of relay 720; at its contact 747 disconnects multiple resistance battery from the winding of Signal Out relay 760; and at its contacts 741, 742 and 743, 744 reverses the polarity of the calling loop back to normal. Polarized relay 220 in cord circuit 200 thereupon releases, causing supervisory lamp 24 to be lit again, as an indication to the operator that the called party has replaced his receiver.

Upon noticing this disconnect signal the operator withdraws calling plug 30 from switchboard jack 141 to release the equipment involved in the setting up of the connection to substation S4. Withdrawal of plug 30 causes the sleeve circuit and also the loop circuit extending over the tip and ring conductors to be opened. Upon interruption of the sleeve circuit, relay 710 in outgoing repeater 700 releases, removing at its contact 711 a multiple ground from the winding of relay 720 and disconnecting at contact 712 resistance battery from Signal Out conductor 147.

Incident to the interruption of the calling loop, relays 210 and 200 in cord circuit 200 restore, whereby the circuit of supervisory lamp 24 is broken at contact 211 of relay 210; and line relay 730 in outgoing repeater 700 releases so that at contact 733 of relay 730 another point is opened in the circuit extending over Signal Out conductor 147 and ground is disconnected at contact 731 from the winding of relay 720. Relay 720, upon restoring at the end of its release delay period, at its contact 721 re-connects line termination 145 across the talking conductors; at its contact 723 removes ground from start conductor 149; at contact 722 re-closes the short circuit across the lower winding of relay 730; at its contact 724 opens the circuit of relay 750 which momentarily operated upon the release of relay 730; at contact 725, relay 720 opens another point in the circuit of relay 740 and at contact 726 another point in the circuit of relay 710; and at contact 727 it removes a multiple ground from the circuit of busy lamp 148, the circuit to this lamp being finally opened when relay 750 restores incident to the afore-mentioned opening of its circuit at contact 724.

When resistance battery was removed at contact 712 from Signal Out conductor 147 as described above, Signal Out relay 760, in releasing, causes the transmission of the control signal carrier frequency from the carrier equipment in terminal 21 to cease so that Signal In relay 810 in terminal 23 at the distant end re-operates, interrupting the circuit of relay 850.

Relay 850 upon restoring, at its contact 853 closes the circuit of relay 870 so that this relay operates momentarily; at its contact 852 relay 850 opens the circuit of relay 860 and at its contact 851 it opens the loop circuit extending to connector 500. Relay 860, in releasing after a slight delay, at contact 861 de-energizes the polarizing winding of relay 840; at contact 862 the relay opens another point in the afore-mentioned loop circuit; at contact 863 it opens another point in the circuit of Signal Out relay 820; and at contact 864 it re-opens the circuit of relay 870 so that this relay, upon restoring after a slight interval, re-connects line termination 159 across the talking conductors.

When the last mentioned loop circuit is opened at contact 851 of relay 850 as above described, supervisory relay 830 releases, reconnecting at its contact 832, resistance battery to the upper spring of make contact 863; and at the connector end of the loop relay 520 restores, causing the release of connector 500 and selector 400 in the manner set out above in connection with the embodiment of the invention according to Fig. 1. The automatic equipment, including carrier link 22, which was used in establishing the connection from the operator to subscriber S4, is now again conditioned for seizure in another call.

It will now be assumed that when in a call from the operator in office C to subscriber S4 in office D the wipers of connector 500 are brought into engagement with the contacts associated with line 16 of this subscriber, this subscriber's line is found busy, so that busy relay 570 operates. As explained in connection with the telephone system according to Fig. 1, busy relay 570 at its contact 572 connects busy flash conductor 84 to the lower winding of calling bridge relay 520 and at contact 573 closes a path extending from ground through the upper winding of release delay relay 540 to busy hold conductor 85. It will be recalled that because of the action of interrupter contacts 86, 87 the lower winding of relay 520 is alternately switched from busy-tone-superimposed ground to battery at a rate of approximately 40 I. P. M.; and that each time the lower winding of relay 520 is thus connected to battery a local holding circuit is completed for relay 540 at interrupter contact 89. Each time battery is connected to the lower winding of relay 520, the loop circuit extending back from the calling side of connector 500 is deenergized and relay 520 releases but the connector is locally held during this flash interval by virtue of the afore-mentioned holding circuit for relay 540. Also incident to each of these deenergizations of the last mentioned loop circuit, supervisory relay 830 restores, closing at its contact 832 resistance battery via contact 863 to Signal Out conductor 157 so that Signal Out relay 820 operates to cause the supervisory signal carrier frequency to be applied to line 194, 195 in carrier terminal 23.

Incident to each transmission of this carrier frequency over line 194, 195, Signal In relay 770 in carrier terminal 21 releases, causing the operation of relay 740. Each time this last mentioned relay operates it connects at its contact 745 a multiple ground to the winding of relay 720 to hold this relay operated during each flash interval; connects, at its contact 747, a multiple resistance battery to Signal Out conductor 147 to maintain relay 760 also in operated condition during each flash interval; and reverses, at its contacts 741, 742 and 743, 744 the direction of current flow over the loop circuit, each time causing the release of supervisory relay 210 in cord circuit 200. As a result supervisory lamp 24 is periodically darkened at the operating rate of interrupter 161, Fig. 5. This flashing signal when received after transmission of the final digit of the called party's number provides the operator with an indication that his line is busy.

As previously noted, each time contact 86 of interrupter 161, Fig. 5, closes between flash intervals, busy tone and ground is connected to the lower winding of relay 520. This tone is transmitted to the operator in the case of a line busy condition substantially as is the ring-back tone when the called line is idle as heretofore explained. More particularly the busy tone is returned by way of repeat coil 151, Fig. 8, to carrier terminal 23, is there used to modulate the east-to-west carrier frequency, the modulation products being passed to line 194, 195 through a band pass transmitting filter in terminal 23, and at the other end, passed through a similar band pass receiving filter. After the busy tone has been separated from the carrier by the de-modulation equipment in terminal 21, it is finally returned by way of repeat coil 152, Fig. 7, and the tip and ring of jack 141 and plug 30 to the operator's headset, not shown, which forms a part of the operator's circuit, Fig. 2. If the cord circuit is switched through at this time, the busy tone is received in the receiver of the distant calling subscriber.

It will thus be noted that the flashing signal is returned: first, namely between connector 500 and terminal 23, over the talking path of the connection over which the busy tone, in alternation with the flashing signal, is also transmitted; that the flashing signal is then, namely between terminals 23 and 21, returned over a special supervisory path or channel separately from the busy tone; and finally, namely between terminal 21 and the calling party, again returned over the talking path, together out in alternation with the busy tone.

If the operator, upon thus being informed of the busy condition, pulls plug 30 in the period between flash intervals, the equipment involved in the setting up of the connection is released in the same manner as described above for the case in which the line of the called party was idle. On the other hand, if the operator withdraws the plug during a flash interval, that is at a time when battery is connected to both the busy flash and busy hold conductor in Fig. 5, and relay 740, Fig. 7, is operated, relay 720 due to the multiple ground connected to it at contact 745 is prevented from releasing and Signal Out relay 760, by virtue of the multiple resistance battery connected to conductor 147 at contact 747, is similarly kept from restoring when relays 710 and 730 release responsive to the withdrawal of plug 30. As a result ground is maintained on the sleeve multiple of jacks 141 at contact 726 and the circuit of busy lamps 148 is held closed at contact 727, whereby outgoing repeater 700 is kept guarded against seizure in a new call. At contact 725 a point in the circuit of relay 740 is maintained closed.

Moreover, as Signal Out relay 760 is held operated the transmission of the control signal frequency over line 194—195 is continued so that Signal In relay 810, Fig. 8, remains released and relays 850 and 860 remain operated. As a result, resistance battery is maintained, through contact 863 of relay 860 and conductor 157, on the winding of Signal Out relay 820 so that this relay stays operated, thereby insuring the continued transmission of the supervisory signal carrier frequency over line 194, 195, and hence, the continued release of Signal In relay 770, Fig. 7, and the continued operation of relay 740. This lock up condition of relay 740, by way of carrier link 22, is terminated only when supervisory relay 830 re-operates at the end of the flash interval to cause the release of relay 820, the re-operation of relay 770, and therefore, the release of relay 740. Since all three relays, 710, 730 and 740 are released at this time, relay 720 is allowed to restore and since conductor 147 is now free of battery, Signal Out relay 760 also is permitted to release. With the control signal carrier frequency thus disconnected from line 194, 195 release of the equipment in office D takes place as previously described in connection with the release of a completed call to subscriber S4.

It will be understood that the foregoing arrangement prevents the seizure of repeater 700 in a new call while the automatic equipment in office D is still locally held by battery supplied over interrupter contact 89 to the upper winding of release delay relay 540, Fig. 5, during the flash interval.

In case the busy flash originates in selector 400 when rotated into its overflow position in an unsuccessful search for an idle connector the equipment in back of this selector functions in the same manner as just explained for the line busy case so that a detailed description of this condition appears unnecessary.

While particular embodiments of this invention have been illustrated and described it is to be understood that numerous modifications in the details of arrangement may be resorted to without departing from the true spirit and scope of the invention as defined in the appended claims. Thus, whereas the embodiment of the invention according to Fig. 6 has been described for a system wherein two offices are connected by means of a carrier link it will be clear that the invention is equally applicable to systems utilizing other types of links, such as radio links or composite or simplex or other trunk circuits, over which signals of the off and on type may independently be transmitted in both directions, e. g. in the manner disclosed in Wicks Patent 2,415,057.

What is claimed is:

1. In a telephone system a switchboard, a lamp at said switchboard, a trunk circuit, automatic switching equipment having outlet connections, means for extending a telephone call from said switchboard through said trunk circuit and switching equipment to desired ones of said outlet connections, busy test means in said automatic switching equipment operative upon finding said outlet connections busy for causing an intermittent electric signal to be returned to said trunk circuit, said trunk circuit having associated therewith a local source for generating an intermittent electric signal and having means triggered by the receipt of said first-mentioned intermittent signal to return an intermittent signal from said local source independently of the receipt of further elements of said first-mentioned intermittent signal from said switching equipment, and means responsive to the receipt of the second-mentioned intermittent signal to cause said lamp to flash.

2. In a telephone system a switchboard, a lamp at said switchboard, a trunk circuit, automatic equipment having outlet connections, means for extending a telephone call from said switchboard through said trunk circuit and switching equipment to desired ones of said outlet connections, busy test means in said automatic switching equipment operative upon finding said outlet connections busy for causing an intermittent electric signal to be returned to said trunk circuit, said trunk circuit having associated therewith a local source for generating an intermittent electric signal and having means triggered by the receipt of said first-mentioned intermittent signal to release said automatic switching equipment and return an intermittent signal from said local source, and means responsive to the receipt of said second-mentioned intermittent signal to cause said lamp to flash.

3. In a telephone system a calling line, a trunk circuit, a local interrupter at said trunk circuit, automatic switching equipment having outlet connections, means for extending a telephone call from said calling line through said trunk circuit and switching equipment to desired ones of said outlet connections, a supervisory loop extending between said trunk circuit and switching equipment and including at the trunk circuit end of said loop a supervisory relay operating over said loop upon seizure, busy test means in said automatic switching equipment operative upon finding said outlet connections busy for causing said relay to be intermittently short-circuited at the switching equipment end of said loop, said supervisory relay being effective upon restoring in response to one of said short circuits to cause said loop to be opened, whereby said supervisory relay is prevented from reoperating and said switch released, and cause an interrupted busy signal to be returned from said local interrupter to said calling line.

4. In a telephone system a switchboard, a lamp at said switchboard, a trunk circuit, a source at said trunk circuit for generating an intermittent electric signal, automatic switching equipment having outlet connections, means for extending a telephone call from said switchboard through said trunk circuit and switching equipment to desired ones of said outlet connections, a supervisory loop circuit extending between said trunk circuit and switching equipment and including at the trunk circuit end of said loop circuit a supervisory relay operating over said loop upon seizure, busy test means in said automatic switching equipment operative upon finding said outlet connections busy for causing said loop circuit to be intermittently de-energized at its switching equipment end and said relay restored, said supervisory relay being effective upon restoring to cause said loop to be opened, whereby said supervisory relay is prevented from reoperating and said switch released, and cause said intermittent electric signal to be returned from said source, and means responsive to the receipt of said last-mentioned signal to cause said lamp to flash.

5. In a telephone system a switchboard, a lamp at said switchboard, a trunk circuit, a source at said trunk circuit for generating an intermittent electric signal, automatic switching equipment having outlet connections, means for extending a telephone call from said switchboard through said trunk circuit and switching equipment to desired ones of said outlet connections, a supervisory loop circuit extending between said trunk circuit and switching equipment and including at the trunk circuit end of said loop a supervisory relay operating over said loop upon seizure, busy test means in said automatic switching equipment operative upon finding said outlet connections busy for causing said loop circuit to be intermittently de-energized at its switching equipment end and said relay restored, a slow-acting relay in said trunk circuit operated upon seizure and held operated under the control of said supervisory relay, said slow-acting relay being effective upon releasing responsive to said supervisory relay being in restored condition for a predetermined length of time to open said loop circuit, whereby said supervisory relay is kept from reoperating and said switching equipment released, and cause said intermittent electric signal to be returned from said source, and means responsive to the receipt of said intermittent signal to cause said lamp to flash.

6. In a telephone system a switchboard, a lamp at said switchboard, a trunk circuit, a source at said trunk circuit for generating an intermittent electric signal, automatic switching equipment having outlet connections, means for extending a telephone call from said switchboard through said trunk circuit and switching equipment to desired ones of said outlet connections, a supervisory loop circuit extending between said trunk circuit and said switching equipment and including at the trunk circuit end of said loop a supervisory relay and at the switching equipment end of said loop calling bridge relay means, a release delay relay controlled by said relay means said supervisory relay and said calling bridge relay means operating over said loop circuit upon seizure, busy test means in said automatic switching equipment operative upon finding said outlet connections busy for causing said loop to be intermittently de-energized at a slow rate compared with the release time of said delay relay, holding means in said switch to locally hold said delay relay during said de-energizations, and said supervisory relay being effective upon restoring incident to one of said de-energizations to cause said loop circuit to be opened, thereby to prevent said supervisory relay from reoperating, release said automatic switching equipment after said holding means has become ineffective, and cause said intermittent electric signal to be returned from said source to said switchboard, and means responsive to the receipt of said last-mentioned signal to cause said lamp to flash.

7. In a telephone system a switchboard, a lamp at said switchboard, a trunk circuit, automatic switching equipment having outlet connections, means for extending a telephone call from said switchboard through said trunk circuit and switching equipment to desired ones of said outlet connections, a supervisory loop circuit extending between said trunk circuit and said switching equipment and including at the trunk circuit end of said loop a supervisory relay operating over said loop upon seizure, busy test means in said switching equipment operative upon finding said outlet connections busy for causing said loop circuit to be intermittently de-energized at its switching equipment end and said relay restored, another supervisory loop extending on the switchboard side of said trunk circuit and including calling bridge relay means in said trunk circuit and at the switchboard end of said loop another supervisory relay, a release delay relay in said trunk circuit controlled by said calling bridge relay means, holding means for maintaining said delay relay operated, a local interrupter device at said trunk circuit having a first and a second conductor and including means to connect said first conductor alternately to battery and ground at a low rate compared with the release time of said delay relay and connect said second conductor to battery in synchronism with the battery connection of said first conductor, said first-mentioned supervisory relay being effective upon restoring to cause said first-mentioned loop to be opened, whereby said relay is prevented from reoperating and said switching equipment released, and cause said ground connected winding to be connected to said first conductor and said holding means to said second conductor, whereby said second-mentioned supervisory relay and the windings of said calling bridge relay means are intermittently short-circuited and said trunk circuit prevented from releasing during said short-circuits, and said second-mentioned supervisory relay being effective upon restoring on each of said short-circuits to cause said lamp to flash.

8. In a telephone system a switchboard, a lamp at said switchboard, a repeater circuit, automatic switching equipment having outlet connections, a trunk interconnecting said repeater and switching equipment, means for extending a telephone call from said switchboard through said repeater and switching equipment to desired ones of said connections, a busy-back relay normally connected to said trunk in said repeater, trunk-busying means at the switching equipment end of said trunk operable to apply an electric potential to said trunk, said busy-back relay being operative in response to said potential to guard said repeater against seizure, a supervisory loop circuit extending over said trunk and including in said repeater a supervisory relay operating over said loop circuit upon seizure, busy test means in said switching equipment operative upon finding said outlet connections busy for causing said loop circuit to be intermittently de-energized at its switching equipment end and said relay restored, another supervisory loop extending on the switchboard side of said repeater and including calling bridge relay means in said repeater and at the switchboard end of said loop another supervisory relay, a release delay relay in said repeater jointly controlled by said calling bridge relay means and said busy-back relay, said first-mentioned supervisory relay being effective upon restoring to cause said first-mentioned loop to be opened, whereby said relay is prevented from reoperating and said switching equipment is released, cause the battery potential on one leg of said calling bridge to be periodically reversed, whereby said second-mentioned supervisory relay and said calling bridge relay means are intermittently short-circuited, and cause a local circuit to be closed to said busy-back relay during each period of short-circuiting of said calling bridge relay means, whereby said repeater is prevented from releasing during said periods, and said second-mentioned supervisory relay being effective upon restoring on each of said short-circuits to cause said lamp to flash.

9. In a telephone system a calling line, a repeater circuit, automatic switching equipment having outlet connections, a trunk interconnecting said repeater and switching equipment, means for extending a telephone call from said calling line through said repeater and switching equipment to desired ones of said connections, a supervisory loop extending over said trunk and including at the repeater end of said loop a supervisory relay operating over said loop upon seizure if said trunk is in order, busy test means in said switching equipment operative upon finding said outlet connections busy for causing said loop circuit to be intermittently de-energized at its switching equipment end and said relay to be restored, said relay failing to operate initially upon seizure if there is a disconnection in said trunk, a slow-acting relay in said repeater controlled by said supervisory relay, said slow-acting relay being responsive to said supervisory relay being in unoperated condition for a predetermined length of time, to open said loop circuit, whereby said supervisory relay is kept from reoperating and said switching equipment released, and cause a busy indication to be returned to said calling line.

10. In a telephone system a switchboard, a lamp at said switchboard, a repeater circuit, automatic switching equipment having outlet connections, a trunk interconnecting said repeater and switching equipment, means for extending a telephone call from said switchboard through said repeater and switching equipment to desired ones of said outlet connections, a supervisory loop circuit extending over said trunk and including at the repeater end of said loop a supervisory relay operating over said loop circuit upon seizure if said trunk is in order, busy test means in said automatic switching equipment operative upon finding said outlet connections busy for causing said loop circuit to be intermittently de-energized at its switching equipment end and said relay restored, said relay failing to operate initially upon seizure if there is a disconnection in said trunk, a slow-acting relay in said repeater controlled by said supervisory relay, another supervisory loop extending on the switchboard side of said repeater and including calling bridge relay means in said repeater and at the switchboard end of said loop another supervisory relay, a release delay relay in said repeater controlled by said calling bridge relay means, holding means for holding said release delay relay operated, said slow-acting relay being responsive to said first-mentioned supervisory relay being in unoperated condition for a predetermined length of time to open said first-mentioned loop, whereby said first-mentioned supervisory relay is kept from reoperating and said switching equipment released if it had originally been taken into use, cause the battery potential on one leg of said calling bridge to be periodically reversed, whereby said second-mentioned supervisory relay and said calling bridge relay means are intermittently short-circuited, and cause a local circuit to be closed for said holding means during each period of short-circuiting of said calling bridge relay means, whereby said repeater is prevented from releasing during said periods, and said second-mentioned supervisory relay being effective upon restoring on each of said short-circuits to cause said lamp to flash.

11. In a telephone system a switchboard, a lamp at said switchboard, a trunk circuit, a source at said trunk circuit for generating an intermittent electric signal, automatic switching equipment, a plurality of lines accessible to said switching equipment, means for extending a telephone connection from said switchboard through said trunk circuit and switching equipment to one of said lines, a supervisory loop circuit extending between said trunk circuit and switching equipment and including at the trunk circuit end of said loop a supervisory relay and a polarized relay, said supervisory relay operating over said loop upon seizure, busy test means in said switching equipment operable upon finding said line busy to cause said loop circuit to be intermittently de-energized and said supervisory relay restored, said supervisory relay being effective upon restoring to cause said loop to be opened, whereby said supervisory relay is prevented from reoperating and said switching equipment released, and cause said intermittent electric signal to be returned from said source to said switchboard, means in said switching equipment operable upon the answering over said line of a completed call to reverse the polarity of said loop circuit and said polarized relay being responsive to said polarity reversal to return a steady answering signal to said switchboard, and means at said switchboard responsive to the receipt of said signals to respectively flash and steadily control said lamp.

12. In a telephone system a calling line, a called line, a line circuit associated with said calling line, connecting means over which a connection between said calling and called line may be set up, said means including a trunk line having two talking conductors and a test conductor, a booster battery, a meter in said line circuit connected to said test conductor, and supervisory means associated with said connecting means and including a supervisory relay, a reversal relay controlled by said supervisory relay, and a resistor, said supervisory relay being effective in response to an answering signal transmitted upon the answering of a call on said called line to switch said test conductor from ground to booster battery through said resistor and said reversal relay being effective in response to the change of condition of said supervisory relay to reverse the current in said talking conductors and short-circuit said resistor.

13. In a telephone system a calling line, a called line, a line circuit associated with said calling line, connecting means over which a connection between said calling and called line may be set up, said means including a trunk line having two talking conductors and a test conductor, a booster battery, a meter in said line circuit connected to said test conductor, and supervisory means associated with said connecting means and including a supervisory relay, a slow-acting reversal relay, an auxiliary relay operated upon seizure of said trunk line and a resistor, said supervisory relay being effective in response to an answering signal transmitted upon the answering of a call on said called line to connect said test conductor from ground to booster battery through said resistor, said reversal being operative in response to the change of condition of said supervisory relay to reverse the current over said talking conductors and short-circuit said resistor, and said auxiliary relay being effective upon restoring in response to the operation of said reversal relay to open said short-circuit and switch said test conductor back to ground, whereby booster battery is both connected to and disconnected from said conductor in two current steps.

14. An automatic telephone switch having a contact bank including a plurality of groups of contact sets, a set of wipers engaging said contacts, an impulse-responsive calling-bridge relay having a normally ground connected winding, means for setting said wipers on a selected one of said groups under the control of said relay and for selecting an idle set of contacts in said group, said means including two magnets for respectively moving said wipers in a primary and a secondary direction, a grounded dial tone source, a transfer relay operative upon seizure of said switch to switch said winding to said dial tone source and effective upon restoring responsive to the termination of a series of impulses to make said primary magnet ineffective and said secondary magnet effective and switch said winding from said dial tone source to ground, a busy signal source, means operative upon said secondary magnet becoming effective to substitute said busy signal source for said dial tone source, and means effective upon all contact sets in the selected group being busy for again operating said transfer relay to switch said winding from ground to said busy signal source.

15. An automatic telephone switch having a contact bank including a plurality of groups of contact sets, a set of wipers engaging said contacts, an impulse-responsive calling-bridge relay having a normally ground connected winding, means for setting said wipers on a selected one of said groups under the control of said relay and for selecting an idle set of contacts in said group, said means including two magnets for respectively moving said wipers in a primary and a secondary direction, a grounded dial tone source, a transfer relay operative upon seizure of said switch to switch said winding to said dial tone source and effective upon restoring responsive to the termination of a series of impulses to make said primary magnet ineffective and said secondary magnet effective and switch said winding from said dial tone source to ground, a busy-flash signal source, means operative upon said secondary magnet becoming effective to substitute said busy-flash signal source for said dial tone source, said secondary magnet being effective upon all contact sets in the selected group being busy to move said wiper to an overflow position, an overflow meter connected to a bank contact in said position, and means effective in said position for again operating said transfer relay to switch said winding from ground to said busy-flash signal source and cause a circuit to be closed to said meter.

16. An automatic telephone switch having a contact bank including a plurality of groups of contact sets, a set of wipers engaging said contacts, an impulse-responsive calling-bridge relay having a normally ground connected winding, means for setting said wipers on a selected one of said groups under the control of said relay and for selecting an idle set of contacts in said group, said means including two magnets for respectively moving said wipers in a primary and a secondary direction, a grounded dial tone source, a transfer relay operative upon seizure of said switch to switch said winding to said grounded dial tone source and effective upon restoring responsive to the termination of the primary series of impulses to make said primary magnet ineffective and said secondary magnet effective and switch said winding from said grounded dial tone source to ground, a battery connected busy-flash signal source, means responsive to said switch moving out of its normal position in respect to said secondary direction to substitute said busy-flash signal source for said dial tone source, and means effective upon all contact sets in the selected group being busy for again operating said transfer relay to switch said winding from ground to said battery-connected busy-flash signal source, thereby causing said calling bridge relay intermittently to release, said off-normal means also being operative to withdraw said primary magnet from the control of said calling bridge relay whereby renewed operation of the primary magnet upon said intermittent release of the calling bridge relay is prevented.

17. An automatic telephone switch of the numerical type having a contact bank, a set of wipers engaging said contacts, said wipers including a test wiper, an impulse-responsive relay, magnet means for setting said wipers on selected ones of said contacts under the control of said relay, means for testing the condition of said selected contacts, a slow-acting relay operated prior to the beginning of a predetermined series of impulses and released at the end of said series under the control of said impulse-responsive relay to control the connection between said testing means and said test wiper, an answer supervisory relay, a metering relay controlled by said answer supervisory relay and in turn controlling said slow-acting relay, a back-control conductor and a booster battery conductor, said metering relay being operative in response to the actuation of said answer supervisory relay to connect said booster battery conductor to said back-control conductor and said slow-acting relay being operative under the control of said metering relay to lock independently and cause the release of said metering relay to disconnect said booster battery from said back-control conductor, whereby booster battery is momentarily applied to said back-control conductor for metering purposes.

18. An automatic telephone switch of the numerical type having a contact bank, a set of wipers engaging said contacts, said wipers including a test wiper, an impulse-responsive relay, magnet means for setting said wipers on selected ones of said contacts under the control of said relay, means for testing the condition of said selected contacts, two slow-acting relays operated prior to the beginning of a predetermined series of impulses and sequentially released at the end of said series under the control of said impulse-responsive relay to respectively connect and disconnect said testing means to and from said test wiper, an answer supervisory relay, a metering relay controlled by said answer supervisory relay and in turn controlling the second of said slow-acting relays, a back-control conductor and a booster battery conductor, said metering relay being operative in response to the actuation of said answer supervisory relay to progressively connect said booster battery conductor to said back-control conductor, and said second slow-acting relay being operative under the control of said metering relay to lock independently and cause the release of said metering relay to progressively disconnect said booster battery from said back-control conductor.

19. In a telephone system a calling line, a called line, a line circuit associated with said calling line, connecting means over which a connection between said calling and called line may be set up, said means including a test conductor, a booster battery, a meter in said line circuit connected to said test conductor, and supervisory means associated with said connecting means and including a supervisory relay responsive to the answering of a call on said called line, a slow-releasing relay controlled by said supervisory relay, an auxiliary relay and a resistor, said slow-releasing relay having a contact set including three sequentially actuated contacts, the first of said contacts, upon operation of said slow-releasing relay being effective to connect said test conductor to booster battery through said resistor, the second to disconnect ground from said test conductor and the third to short-circuit said resistor, said auxiliary relay being operative in response to the operation of said slow-releasing relay to lock independently and cause the release of the last-mentioned relay, whereby the third of said contacts, on releasing of said relay, is effective to open said short circuit, the second to reconnect ground to said test conductor and the first to disconnect booster battery thru said resistor from said test conductor.

20. In a telephone system a switchboard, a lamp at said switchboard, an outgoing repeater, an incoming repeater, a connecting link interposed between said repeaters, automatic switching equipment having calling bridge relay means and a release delay relay controlled by said relay means, a plurality of lines accessible to said switching equipment, means for extending a telephone connection from said switchboard through said outgoing repeater, said link, said incoming repeater and said switching equipment to one of said lines, a supervisory loop circuit extending between said incoming repeater and said switching equipment and including a supervisory relay at the repeater end of said loop and said calling bridge relay means in said equipment, said supervisory relay and said calling bridge relay means operating over said loop upon seizure, a supervisory circuit associated with said link over which supervisory signals may be returned by changing the condition of said circuit from one to the other of two possible electrical conditions, busy test means in said switching equipment operative upon finding said line busy to intermittently de-energize said loop at a slow rate compared with the release time of said delay relay, holding means in said switching equipment to locally hold said delay relay during each of said de-energizations, said supervisory relay being effective upon restoring in response to said intermittent de-energizations to cause the condition of said supervisory circuit to be intermittently changed, and means in said outgoing repeater responsive to each said change of condition to cause said lamp to be lit and said outgoing repeater to be held, whereby unguarding of said repeater is prevented during the intervals in which the switching equipment is locally held.

21. In a telephone system a switchboard, a lamp at said switchboard, an outgoing repeater, an incoming repeater, a connecting link interposed between said repeaters, automatic switching equipment having calling bridge relay means and a release delay relay controlled by said relay means, a plurality of lines accessible to said switching equipment, means for extending a telephone connection from said switchboard through said outgoing repeater, said link, said incoming repeater and said switching equipment to one of said lines, a supervisory loop circuit extending between said incoming repeater and said switching equipment and including a supervisory relay at the repeater end of said loop and said calling bridge relay means in said equipment, said supervisory relay and said calling bridge relay means operating over said loop upon seizure and said link having associated therewith a control circuit for the transmission of forward signals and a supervisory circuit for the transmission of reverse signals, said signals being transmitted by changing the condition of the respective circuit from one to the other of two possible electrical conditions, busy test means in said switching equipment operative upon finding said line busy to intermittently de-energize said loop at a slow rate compared with the release time of said delay relay, holding means in said switching equipment to locally hold said delay relay during each of said de-energizations, said supervisory relay being effective upon restoring in response to said intermittent de-energizations to cause the condition of said supervisory circuit to be intermittently changed, and means in said outgoing repeater responsive to each said change of condition to cause said lamp to be lit, said outgoing repeater held guarded and said control circuit prevented from changing its condition.

No references cited.